United States Patent
Knaan et al.

(10) Patent No.: US 11,599,747 B2
(45) Date of Patent: Mar. 7, 2023

(54) DEPTH PREDICTION FROM DUAL PIXEL IMAGES

(71) Applicant: Google LLC, Mountain View, CA (US)

(72) Inventors: Yael Pritch Knaan, Mountain View, CA (US); Marc Levoy, Stanford, CA (US); Neal Wadhwa, Mountain View, CA (US); Rahul Garg, Sunnyvale, CA (US); Sameer Ansari, San Francisco, CA (US); Jiawen Chen, Ann Arbor, MI (US)

(73) Assignee: Google LLC, Mountain View, CA (US)

( * ) Notice: Subject to any disclaimer, the term of this patent is extended or adjusted under 35 U.S.C. 154(b) by 54 days.

(21) Appl. No.: 17/090,948

(22) Filed: Nov. 6, 2020

(65) Prior Publication Data
US 2021/0056349 A1   Feb. 25, 2021

Related U.S. Application Data

(63) Continuation of application No. 16/246,280, filed on Jan. 11, 2019, now Pat. No. 10,860,889.

(51) Int. Cl.
*G06K 9/62*   (2022.01)

(52) U.S. Cl.
CPC ......... *G06K 9/6256* (2013.01); *G06K 9/6262* (2013.01)

(58) Field of Classification Search
CPC ............................ G06K 9/6256; G06K 9/6262
USPC ......................................................... 382/157
See application file for complete search history.

(56) References Cited

U.S. PATENT DOCUMENTS

| | | | |
|---|---|---|---|
| 10,860,889 B2 | 12/2020 | Knaan et al. | |
| 2014/0118509 A1* | 5/2014 | Kroon | H04N 13/111 348/51 |
| 2017/0278289 A1* | 9/2017 | Marino | G06T 11/60 |
| 2019/0028629 A1* | 1/2019 | Yoon | H04N 5/23212 |
| 2020/0104034 A1* | 4/2020 | Lee | G06T 7/11 |

FOREIGN PATENT DOCUMENTS

CN   108230384 A   6/2018

OTHER PUBLICATIONS

Bian, Zhen-Peng, et al. "Fall detection based on body part tracking using a depth camera." IEEE journal of biomedical and health informatics 19.2 (2014): 430-439. (Year: 2014).*

(Continued)

*Primary Examiner* — Amandeep Saini
(74) *Attorney, Agent, or Firm* — McDonnell Boehnen Hulbert & Berghoff LLP

(57) ABSTRACT

Apparatus and methods related to using machine learning to determine depth maps for dual pixel images of objects are provided. A computing device can receive a dual pixel image of at least a foreground object. The dual pixel image can include a plurality of dual pixels. A dual pixel of the plurality of dual pixels can include a left-side pixel and a right-side pixel that both represent light incident on a single dual pixel element used to capture the dual pixel image. The computing device can be used to train a machine learning system to determine a depth map associated with the dual pixel image. The computing device can provide the trained machine learning system.

20 Claims, 15 Drawing Sheets

Dual Pixel Image 200

Left Side Image 210

Right Side Image 220

Background 230a, Foreground Object 240a, Background 230b, Foreground Object 240b

(56) References Cited

OTHER PUBLICATIONS

Carvalho, M., et al., "On Regression Losses for Deep Depth Estimation", 2018 25th IEEE International Conference on Imaging Processing (ICIP), IEEE, Oct. 7, 2018, pp. 2915-2919.

Garg, R., et al., "Learning to Predict Depth on the Pixel 3 Phones", Google AI Blog, Nov. 29, 2018, [Retrieved from the Internet Mar. 23, 2020:>URL:http://web.archive.org/20181219122759/https://ai.googleblog.com/2018/11/learning-to-predict-depth-on-pixel-3.html<].

International Search Report and Written Opinion, for International Application No. PCT/US2020/013007, dated Apr. 6, 2020, pp. 1-76.

D. Eigen., "Predicting Depth, Surface Normals and Semantic Labels with a Common Multi-Scale Convolutional Architecture", available via the Internet at cs.nyu.edu/~deigen/dnl/ (last visited Oct. 24, 2018).

D. Eigen et al., "Predicting Depth, Surface Normals and Semantic Labels with a Common Multi-Scale Convolutional Architecture", Dec. 17, 2015, arXiv:1411.4734v4 [cs.CV].

N. Mayer et al., "A Large Dataset to Train Convolutional Networks for Disparity, Optical Flow, and Sense Flow Estimation", Dec. 7, 2015, arXiv:1512.02134v1 [cs.CV].

V. Vanhoucke, "Learning Visual Representations at Scale", Apr. 2014.

N. Wadhwa et al., "Synthetic Depth-of-Field with a Single-Camera Mobile Phone", Aug. 2018, ACM Trans. Graph., vol. 37, No. 4, Article No. 64.

R. Winston, "An Introduction to Dual Pixel Autofocus (DPAF)", Apr. 12, 2017, available via the Internet at www.usa.canon.com/internet/portal/us/home/learn/education/topics/article/2018/July/Intro-to-Dual-Pixel-Autofocus-(DPAF)/Intro-to-Dual-Pixel-Autofocus-(DPAF) (last visted Oct. 24, 2018).

* cited by examiner

Stride 1 Encoder Function S1EF(Int)
600

Stride 2 Encoder Function S2EF(Int)
650

Decoder Function DF(Int)
700

| Legend | |
|---|---|
| ▨ - 2D Convolution (Conv2D) Layers | ⊕ - Addition + Parametric Rectifier Linear Unit (APReLU) |
| ▥ - Separable Conv2D Layers | ▨ - Transpose Conv2D Layers |
| ▤ - MaxPool Layers | |

1510 Receive, at a computing device, a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image 1520 Train a machine learning system to determine a depth map associated with the dual pixel image using the computing device 1530 Provide the trained machine learning system using the computing device

1610 Receive, at a computing device, a dual pixel image of at least a foreground object, the dual pixel image comprising a plurality of dual pixels, wherein a dual pixel of the plurality of dual pixels comprises a left-side pixel and a right-side pixel that both represent light incident on a single dual pixel element used to capture the dual pixel image

1620 Provide the dual pixel image to a trained machine learning system to determine a depth map for the plurality of dual pixels of the dual pixel image

1630 Determine an output image based on the dual pixel image and the depth map using the computing device

FIG. 16

DEPTH PREDICTION FROM DUAL PIXEL IMAGES

CROSS-REFERENCE TO RELATED APPLICATIONS

This application is a continuation of U.S. patent application Ser. No. 16/246,280, filed Jan. 11, 2019, which is incorporated herein by reference.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized.

SUMMARY

In one aspect, a computer-implemented method is provided. A computing device receives a dual pixel image of at least a foreground object. The dual pixel image includes a plurality of dual pixels. A dual pixel of the plurality of dual pixels includes a left-side pixel and a right-side pixel that both represent light incident on a single dual pixel element used to capture the dual pixel image. The computing device is used to train a machine learning system to determine a depth map associated with the dual pixel image. The computing device provides the trained machine learning system.

In another aspect, a computing device is provided. The computing device includes one or more processors and data storage. The data storage has stored thereon computer-executable instructions that, when executed by the one or more processors, cause the computing device to carry out functions. The functions include: receiving a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image; training a machine learning system to determine a depth map associated with the dual pixel image; and providing the trained machine learning system.

In another aspect, an article of manufacture is provided. The article of manufacture includes one or more computer readable media having computer-readable instructions stored thereon that, when executed by one or more processors of a computing device, cause the computing device to carry out functions. The functions include: receiving a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image; training a machine learning system to determine a depth map associated with the dual pixel image; and providing the trained machine learning system.

In another aspect, a computing device is provided. The computing device includes: means for receiving a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image; means for training a machine learning system to determine a depth map associated with the dual pixel image; and means for providing the trained machine learning system.

In another aspect, a computer-implemented method is provided. A computing device receives a dual pixel image of at least a foreground object. The dual pixel image includes a plurality of dual pixels. A dual pixel of the plurality of dual pixels includes a left-side pixel and a right-side pixel that both represent light incident on a single dual pixel element used to capture the dual pixel image. The dual pixel image is provided to a trained machine learning system to determine a depth map for the plurality of dual pixels of the dual pixel image. The computing device is used to determine an output image based on the dual pixel image and the depth map.

In another aspect, a computing device is provided. The computing device includes one or more processors and data storage. The data storage has stored thereon computer-executable instructions that, when executed by the one or more processors, cause the computing device to carry out functions. The functions include: receiving a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image; providing the dual pixel image to a trained machine learning system to determine a depth map for the plurality of dual pixels of the dual pixel image; and determining an output image based on the dual pixel image and the depth map.

In another aspect, an article of manufacture is provided. The article of manufacture includes one or more computer readable media having computer-readable instructions stored thereon that, when executed by one or more processors of a computing device, cause the computing device to carry out functions. The functions include: receiving a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image; providing the dual pixel image to a trained machine learning system to determine a depth map for the plurality of dual pixels of the dual pixel image; and determining an output image based on the dual pixel image and the depth map.

In another aspect, a computing device is provided. The computing device includes: means for receiving a dual pixel image of at least a foreground object, the dual pixel image including a plurality of dual pixels, where a dual pixel of the plurality of dual pixels includes a left-side pixel and a right-side pixel that both represent light incident on a single dual pixel element used to capture the dual pixel image; means for providing the dual pixel image to a trained machine learning system to determine a depth map for the plurality of dual pixels of the dual pixel image; and means for determining an output image based on the dual pixel image and the depth map.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 15 is a flowchart of a method, in accordance with example embodiments.

FIG. 16 is a flowchart of another method, in accordance with example embodiments.

DETAILED DESCRIPTION

Figure 1:
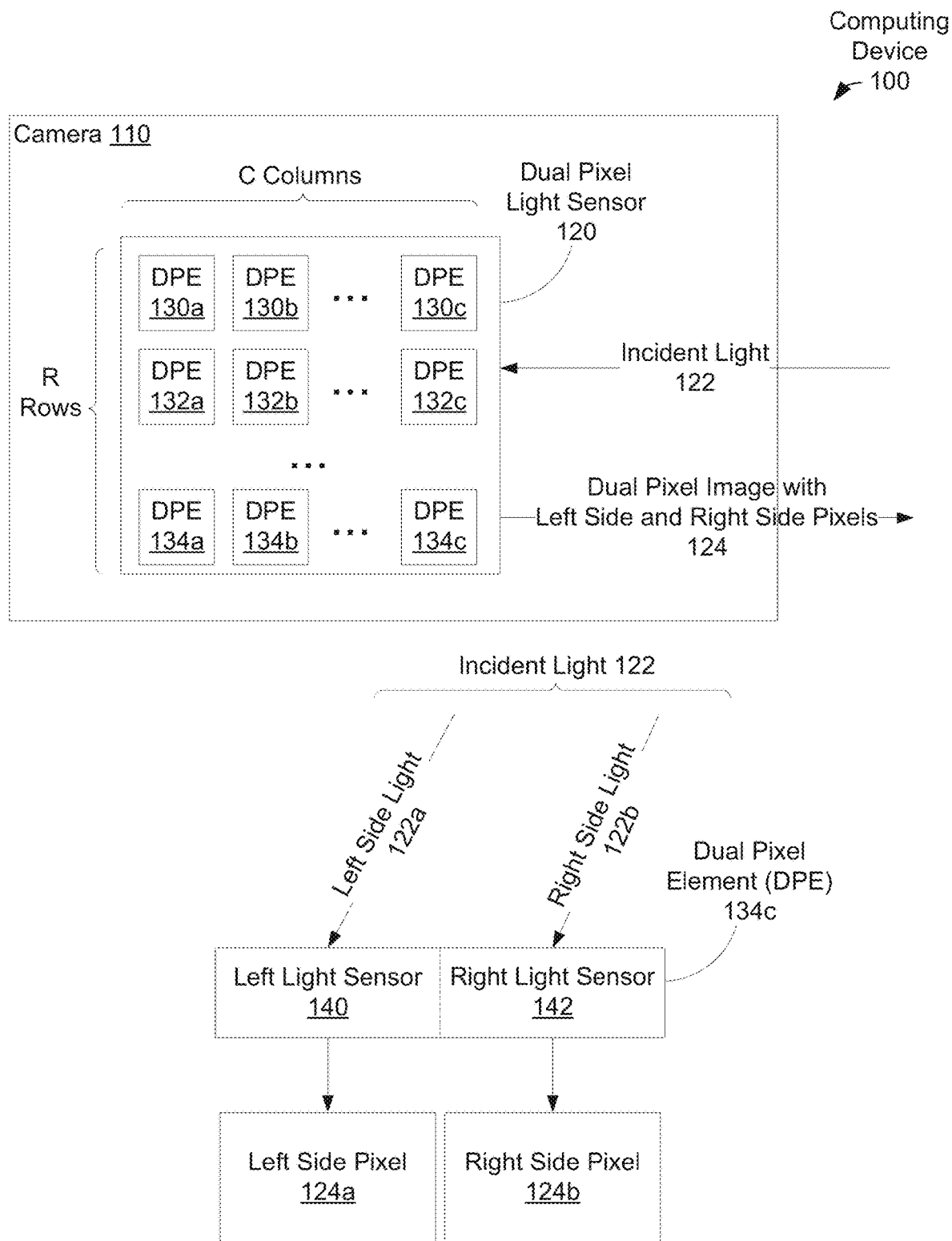
FIG. 1 illustrates a computing device that includes a camera, in accordance with example embodiments.

This application describes selectively blurring a portion of an image using machine learning techniques, such as but not limited to neural network techniques. After an image of an object, such as a person, is captured, the captured image can be modified to further accentuate the object. One technique for modifying images to accentuate an object depicted in the image is to blur other objects in the image—the resulting selectively-blurred image shows a foreground object (or objects) in focus, and background objects and/or scenery out of focus, thereby accentuating the foreground object(s) within the image. As such, an image-processing-related technical problem arises that involves selectively blurring a portion of an already-obtained image; e.g., selectively blurring only a background portion of the already-obtained image.

A depth map, which can be a map or other data structure that stores information relating to the distance of the surfaces of scene objects from a viewpoint, can be used in partially blurring an already-obtained image; e.g., a depth map for an image captured by a camera can specify information relating to the distance from the camera to surfaces of objects captured in the image, where the depth map can specify the information for the image on a pixel-by-pixel (or other) basis. For example, the depth map can include a depth value for each pixel in the image, where the depth value DV1 of depth map DM for pixel PIX of image IM represents a distance from the viewpoint to one or more objects depicted by pixel PIX in image IM. As another example, image IM can be divided into regions (e.g., blocks of N×M pixels where N and M are positive integers) and the depth map can include a depth value for each region of pixels in the image; e.g., a depth value DV2 of depth map DM for pixel region PIXR of image IM represents a distance from the viewpoint to one or more objects depicted by pixel region PIXR in image IM. Other depth maps and correspondences between pixels of images and depth values of depth maps are possible as well; e.g., one depth value in a depth map for each dual pixel of a dual pixel image.

To partially blur images, a portion of the image whose depth, or distance from the camera, is further away than foreground object(s) as determined by depth data of the depth map can be at least partially blurred. Appropriate blurring software can employ the depth map to apply a natural and pleasing depth-dependent blur to a background of an image while keeping a foreground object in sharp focus. Also, depth maps of images may have other applications in computational photography, augmented reality, and image processing.

A common approach to estimating depth maps of images involves use two cameras. However, depth maps can be estimated from images taken by a single camera that uses dual pixels on light-detecting sensors; e.g., a camera that provides autofocus functionality. A dual pixel of an image can be thought of as a pixel that has been split into two parts, such as a left pixel and a right pixel. Then, a dual pixel image is an image that includes dual pixels. For example, an image IMAGE1 having R rows and C columns of pixels can be and/or be based on a dual pixel image DPI having R rows and C columns of dual pixels that correspond to the pixels of image IMAGE1.

To capture dual pixels, the camera can use a sensor that captures two slightly different views of a scene. In comparing these two views, a foreground object can appear to be stationary while background objects move vertically in an effect referred to as parallax. For example, a "selfie" or image of a person taken by that person, typically has the face of that person as a foreground object and may have other objects in the background. So, in comparing two dual pixel views of the selfie, the face of that person would appear to be stationary while background objects would appear to move vertically.

Another common approach to estimating depth maps of images involves use of dedicated depth sensors. For example, a time-of-flight camera can be used to estimate depth maps. However, this approach do not work when these dedicated depth sensors are unavailable.

Dual pixel images can enable estimation of depth maps of images taken by a single camera. One approach to compute depth from dual pixel images includes treating one dual pixel image as two different single pixel images and try to match the two different single pixel images. The depth of each point determines how much it moves between the two views. Hence, we can estimate depth by matching each point in one view with its corresponding point in the other view. This method is called depth from stereo. However, finding these correspondences in dual pixel images is extremely challenging because scene points barely move between the views. Depth from stereo can be improved upon based on an observation that the parallax is only one of many depth cues present in images, including semantic, defocus, and perhaps other cues. An example semantic cue is an inference that a relatively-close object takes up more pixels in an image than a relatively-far object. A defocus cue is a cue based on the observation that points that are relatively far from an observer (e.g., a camera) appear less sharp/blurrier than relatively-close points.

A proposed approach for estimation and/or computation of depth from dual pixel images of is to use machine learning techniques, such as neural networks, to predict depth from dual pixel images. In particular, dual pixel images can be provided to a neural network to train the neural network to predict depth maps for the input dual pixel images. For example, the neural network can be and/or can include a convolutional neural network. The neural network can take advantage of parallax cues, semantic cues, and perhaps other aspects of dual pixel images to predict depth maps for input dual pixel images.

The neural network can be trained on a relatively-large dataset (e.g., 50,000 or more) of images. The dataset can include multiple photos of an object taken from different viewpoints at substantially the same time to provide ground truth data for training the neural network to predict depth maps from dual pixel images. For example, a multi-camera device can be used to obtain multiple photos of an object taken from a plurality of cameras at slightly different angles to provide better ground-truth depth data to train the neural network. In some examples, the multi-camera device can include multiple mobile computing devices, each equipped with a camera that can take dual pixel images. Then, the resulting dual pixel images, which are training data for the neural network, are similar to dual pixel images taken using the same or similar types of cameras on other mobile computing devices; e.g., user's mobile computing devices.

As a specific example, the multi-camera device can include five identical mobile computing devices; e.g., five identical smart phones. Dual pixel images can be simultaneously captured by cameras of all five mobile computing devices substantially simultaneously; e.g., within a tolerance of 0.5-3 milliseconds (ms). Synchronization between the cameras ensures that that depth can be calculated for a dynamic scene; e.g., a scene with moving objects.

Structure from motion and multi view stereo techniques can be used to compute depth maps from the dual pixel images captured by the multi-camera device. The use of five viewpoints eliminates the aperture problem because there is parallax in multiple directions. The arrangement of the cameras ensures that a point in an image is usually visible in at least one other image resulting in fewer points with no correspondences. In addition, the "baseline" or distance between the cameras of the multi-camera device is larger than a baseline of sensors used to capture typical dual pixel images, resulting in more accurate depth estimation. As such, the use of five synchronized viewpoints can lead to high-quality depth maps, which then serve as ground-truth depth maps in training the neural network.

As part of training the neural network, a loss function can be used to evaluate estimated depth data and/or estimated depth maps provided by the neural network with respect to ground-truth depth data. The loss function can be invariant to depth ambiguities in the dual pixel data and so enable the neural network to learn from the ground-truth depth data.

Once the neural network is trained, the trained neural network can receive an image of an object O having dual pixel data as an input and estimate a depth map having estimated depth data for the input image. The depth map can then be provided to blurring software. The blurring software can use the depth map to blur a background portion of the image without blurring a foreground portion of the image having object O, thereby accentuating object O within the image. As such, the image-processing-related technical problem of selectively blurring a portion of an already-obtained image can be solved using the herein-described techniques that utilize machine learning/neural network to estimate depth maps used in selectively blurring images.

The herein-described techniques to selectively blur images can be performed by a mobile computing device, such as but not limited to a smart phone. For example, the trained neural network can be provided to a mobile computing device. Then, after the mobile computing device takes a dual pixel image, the trained neural network can be invoked to estimate and provide a depth map for the dual pixel image. Then, depth rendering software on the mobile computing device can use the depth map and perhaps object segmentation data (e.g., a mask that outlines a person or other object of interest within the dual pixel image) to selectively blur the dual pixel image. For example, a user can apply the blurring software to draw attention to an object (or objects) in the foreground by blurring the background. The selectively-blurred image can then be displayed, communicated, stored, and/or otherwise utilized; e.g., printed to paper.

These herein-described techniques provide natural looking enhanced images with foreground objects by selectively blurring background objects. The use of machine learning technology as described herein, such as the use of neural networks, enables estimation of depth maps that take into account both traditional depth cues, such as parallax, and additional depth cues, such as, but not limited to semantic cues and defocus cues. As such, selectively blurred images generated using depth maps using the machine learning technology described herein can look better than selectively blurred images using other techniques. Also, the herein-described techniques can be executed on mobile devices, allowing users to selectively blur an image almost immediately after the image is captured. In examples where a same mobile device that captured the image can selectively blur the image, selective blurring of images can be performed using the herein-described techniques even without network connectivity.

Machine Learning Techniques for Predicting Depth from Dual Pixel Images

FIG. 1 illustrates computing device 100 that includes camera 110, in accordance with example embodiments. Camera 110 includes dual pixel light sensor 120, which in turn has a grid of R rows×C columns of dual pixel elements (DPEs). FIG. 1 shows that a first row of dual pixel light sensor 120 includes C dual pixel elements 130a, 130b . . . 130c, a second row of dual pixel light sensor 120 includes C dual pixel elements 132a, 132b . . . 132c, and so on until reaching a Rth row of dual pixel light sensor 120 that includes C dual pixel elements 134a, 134b . . . 134c.

When camera 110 is instructed to capture an image of an environment (e.g., an image of a face of a person and/or other objects in the environment) incident light 122 from the environment enters into camera 110 and reaches dual pixel light sensor 120. Dual pixel light sensor 120 then uses dual pixel elements 130a . . . 134c to capture and record information about incident light 122. Then, camera 110 utilizes the recorded information about incident light 122 to generate an image of the environment, illustrated in FIG. 1 as dual pixel image 124.

An example of incident light 122 reaching dual pixel element 134c of dual pixel light sensor 120 is illustrated in a lower portion of FIG. 1. Each of the dual pixel elements of dual pixel light sensor 120, including dual pixel element 134c, can include two light sensors. In the example of dual pixel element 134c, these two light sensors are shown in FIG. 1 as left light sensor 140 and right light sensor 142.

Then, as incident light 122 reaches dual pixel element 134c, a first portion of incident light 122 reaches and is incident on left light sensor 140 and a second portion of incident light 122 reaches and is incident on right light sensor 142—FIG. 1 shows the first portion of incident light 122 reaching left light sensor 140 as left side light 122a and the second portion of incident light 122 reaching right light sensor 142 as right side light 122b. When left side light 122a reaches left light sensor 140, left light sensor 140 captures left side light 122a and consequently records the captured light as left side pixel 124a. Also, when right side light 122b reaches right light sensor 142, right light sensor 142 captures right side light 122b and consequently records the captured light as right side pixel 124b. And, dual pixel image 124 includes left side and right side pixels from each dual pixel element in dual pixel light sensor 120 including left side pixel 124a and right side pixel 124b.

Left side light 122a differs from and arrives at left light sensor 140 at a (slightly) different angle from right side light 122b that arrives at right light sensor 142. As left side light 122a arrives at a different angle from right side light 122b, left side pixel 124a has a (slightly) different perspective from right side pixel 124a. As such, a left side image for dual pixel image 124, which is made up of all of the left side pixels of dual pixel image 124, would be (slightly) different from a right side image of dual pixel image 124 that is made up of all of the right side pixels of dual pixel image 124. As such, parallax will be present between the left side image and the right side image of dual pixel image 124.

Figure 2:
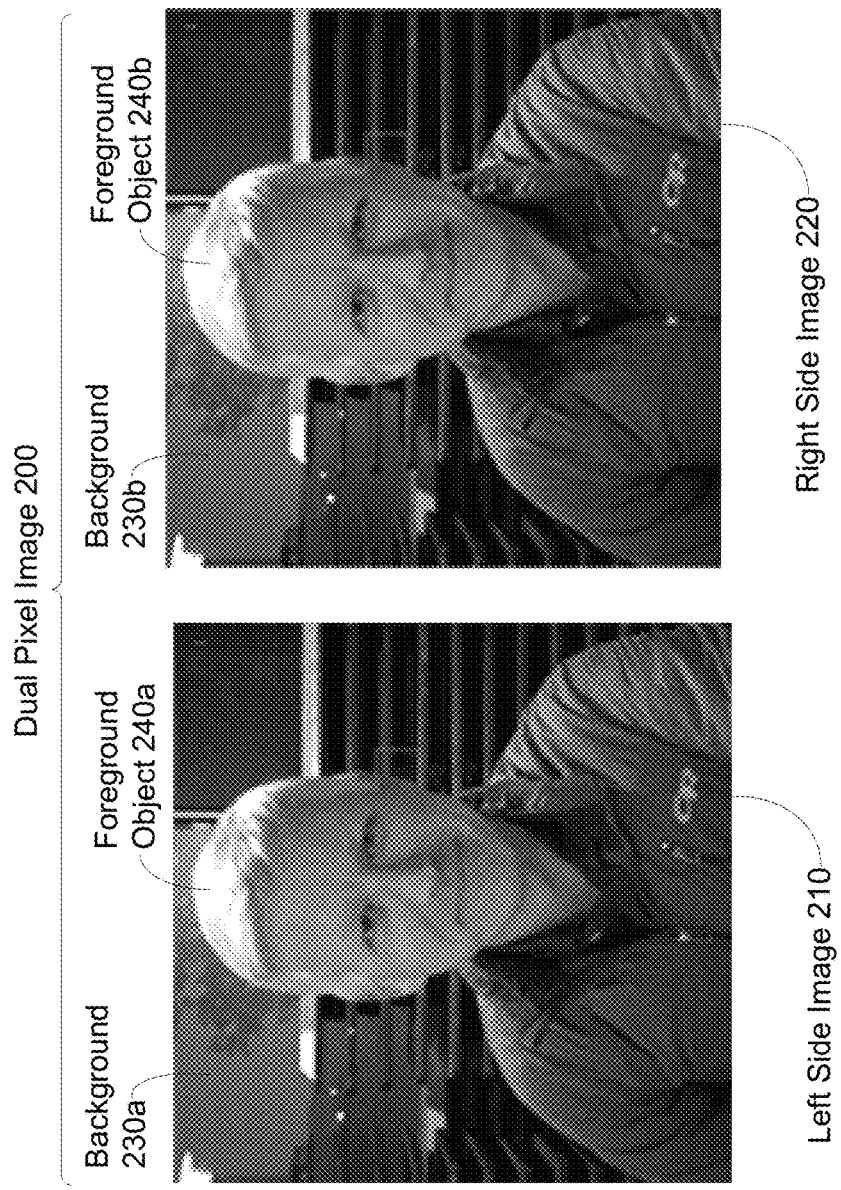
FIG. 2 shows a dual pixel image, in accordance with example embodiments.

FIG. 2 shows dual pixel image 200, in accordance with example embodiments. Dual pixel image 200 includes left side image 210 and right side image 220. An image can have a foreground, or portion of the image that is nearest to an observer; e.g., a camera capturing the image, and a background, or portion of the image that is further from the observer. In some cases, the foreground and the background are mutually exclusive portions that together make up an entire image.

FIG. 2 shows that dual pixel image 200 has a foreground and a background, and therefore both left side image 210 and right side image 220 each have a foreground and a background. For example, left side image 210 of dual pixel image 200 has background 230a that includes buildings and trees and has a person as foreground object 240a. Similarly, right side image 220 of dual pixel image 200 has background 230b that also includes buildings and trees and also has a person as foreground object 240b.

Both left side image 210 and right side image 220 both show a same scene with the same person as a foreground object and the same buildings and trees in the background. However, parallax is present between left side image 210 and right side image 220, where the parallax may be most noticeable near the ear of the person shown as the foreground object between left side image 210 and right side image 220. As indicated above at least in the context of FIG. 1, parallax is due to (slight) differences in light direction of incident light captured for left side image 210 from incident light captured for right side image 220.

Figure 3:
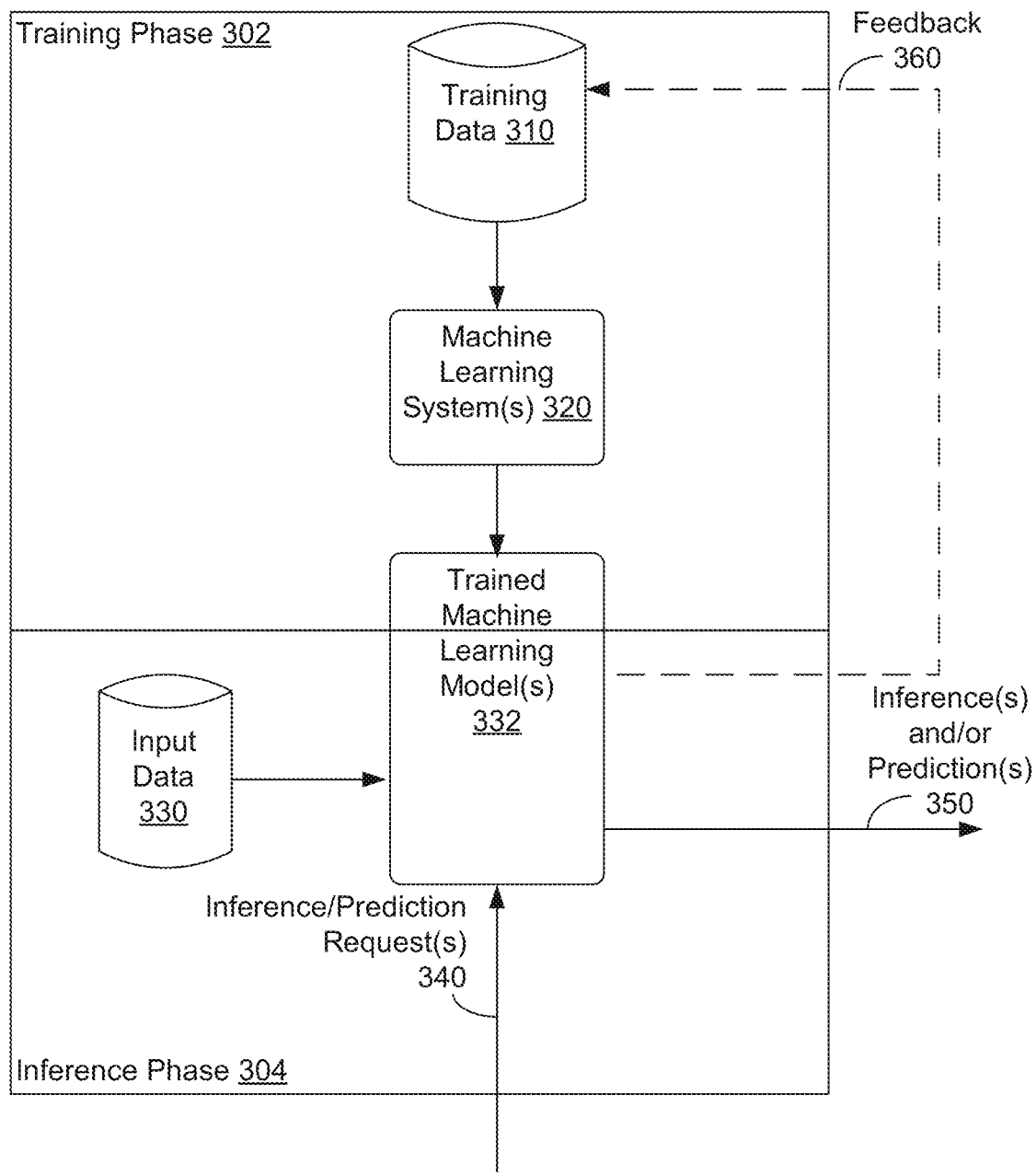
FIG. 3 is a diagram illustrating training and inference phases of a machine learning model, in accordance with example embodiments.

FIG. 3 shows system 300 illustrating a training phase 302 and an inference phase 304 of trained machine learning model(s) 332, in accordance with example embodiments. Some machine learning techniques involve training one or more machine learning systems on an input set of training data to recognize patterns in the training data and provide output inferences and/or predictions about (patterns in the) training data. The resulting trained machine learning system can be called a trained machine learning model or machine learning model, for short. For example, FIG. 3 shows training phase 302 where one or more machine learning systems 320 are being trained on training data 310 to become one or more trained machine learning models 332. Then, during inference phase 304, trained machine learning model(s) 332 can receive input data 330 and one or more inference/prediction requests 340 (perhaps as part of input data 330) and responsively provide as an output one or more inferences and/or predictions 350.

Machine learning system(s) 320 may include, but are not limited to: an artificial neural network (e.g., a herein-described convolutional neural network using herein-described confidence learning techniques, a recurrent neural network), a Bayesian network, a hidden Markov model, a Markov decision process, a logistic regression function, a support vector machine, a suitable statistical machine learning algorithm, and/or a heuristic machine learning system. During training phase 302, machine learning system(s) 320 can be trained by providing at least training data 310 as training input using training techniques, such as but not limited to, unsupervised, supervised, semi-supervised, reinforcement learning, transfer learning, incremental learning, and/or curriculum learning techniques.

Unsupervised learning involves providing a portion (or all) of training data 310 to machine learning system(s) 320. Then, machine learning system(s) 320 can determine one or more output inferences based on the provided portion (or all) of training data 310. Supervised learning can involve providing a portion of training data 310 to machine learning system(s) 320, with machine learning system(s) 320 determining one or more output inferences based on the provided portion of training data 310, and the output inference(s) are either accepted or corrected based on correct results associated with training data 310. In some examples, supervised learning of machine learning system(s) 320 can be governed by a set of rules and/or a set of labels for the training input, and the set of rules and/or set of labels may be used to correct inferences of machine learning system(s) 320.

Semi-supervised learning can involve having correct results for part, but not all, of training data 310. During semi-supervised learning, supervised learning is used for a portion of training data 310 having correct results, and unsupervised learning is used for a portion of training data 310 not having correct results. Reinforcement learning involves machine learning system(s) 320 can involve receiving a reward signal regarding a prior inference, where the reward signal can be a numerical value. During reinforcement learning, machine learning system(s) 320 can output an inference and receive a reward signal in response, where machine learning system(s) 320 are configured to try to maximize the numerical value of the reward signal. In some examples, reinforcement learning also utilizes a value function that provides a numerical value representing an expected total of the numerical values provided by the reward signal over time.

Transfer learning techniques can involve trained machine learning model(s) 332 being pre-trained on one set of data and additionally trained using training data 310. More particularly, machine learning system(s) 320 can be pre-trained on data from one or more computing devices and a resulting trained machine learning model provided to computing device CD1, where CD1 is intended to execute the trained machine learning model during inference phase 304. Then, during training phase 302, the pre-trained machine learning model can be additionally trained using training data 310, where training data 310 can be derived from kernel and non-kernel data of computing device CD1. This further training of the machine learning system(s) 320 and/or the pre-trained trained machine learning model using training data 310 of CD1's data can be performed using either supervised or unsupervised learning. Once machine learning system(s) 320 and/or the pre-trained machine learning model has been trained on at least training data 310, training phase 302 can be completed. The trained resulting machine learning model can be utilized as at least one of trained machine learning model(s) 332.

Incremental learning techniques can involve providing trained machine learning model(s) 332 (and perhaps machine learning system(s) 320) with input data that is used to continuously extend knowledge of trained machine learning model(s) 332. Curriculum learning techniques. can involve machine learning system(s) 320 with training data arranged in a particular order, such as providing relatively-easy training examples first and proceeding with progressively more difficult training examples e.g., analogously to a curriculum or course of study at a school. Other techniques for training machine learning system(s) 320 and/or trained machine learning model(s) 332 are possible as well.

In some examples, after training phase 302 has been completed but before inference phase 304 begins, trained machine learning model(s) 332 can be provided to a computing device CD1 where trained machine learning model(s) 332 are not already resident; e.g., after training phase 302 has been completed, trained machine learning model(s) 332 can be downloaded to computing device CD1.

For example, a computing device CD2 storing trained machine learning model(s) 332 can provide trained machine learning model(s) 332 to computing device CD1 by one or more of: communicating a copy of trained machine learning model(s) 332 to computing device CD1, making a copy of trained machine learning model(s) 332 for computing device CD1, providing access to trained machine learning model(s) 332 computing device CD1, and/or otherwise providing the trained machine learning system to computing device CD1. In some examples, trained machine learning model(s) 332 can be used by computing device CD1 immediately after being provided by computing device CD2. In some examples, after trained machine learning model(s) 332 are provided to computing device CD1, trained machine learning model(s) 332 can be installed and/or otherwise prepared for use before trained machine learning model(s) 332 can be used by computing device CD1.

During inference phase 304, trained machine learning model(s) 332 can receive input data 330 and generate and output corresponding inference(s) and/or prediction(s) 350 about input data 330. As such, input data 330 can be used as an input to trained machine learning model(s) 332 for providing corresponding inference(s) and/or prediction(s) 350 to kernel components and non-kernel components. For example, trained machine learning model(s) 332 can generate inference(s) and/or prediction(s) 350 in response to inference/prediction request(s) 340. In some examples, trained machine learning model(s) 332 can be executed by a portion of other software. For example, trained machine learning model(s) 332 can be executed by an inference or prediction daemon to be readily available to provide inferences and/or predictions upon request. Input data 330 can include data from computing device CD1 executing trained machine learning model(s) 332 and/or input data from one or more computing devices other than CD1.

In some examples, input data 330 can include a collection of images provided by one or more sources. The collection of images can include images of an object, such as a human face, where the images of the human face are taken under different lighting conditions, images of multiple objects, images resident on computing device CD1, and/or other images. In particular examples, the collection of images can include one or more dual pixel images. Other types of input data are possible as well.

Inference(s) and/or prediction(s) 350 can include output images, depth maps, numerical values, and/or other output data produced by trained machine learning model(s) 332 operating on input data 330 (and training data 310). In some examples, trained machine learning model(s) 332 can use output inference(s) and/or prediction(s) 350 as input feedback 360. Trained machine learning model(s) 332 can also rely on past inferences as inputs for generating new inferences.

In some examples, machine learning system(s) 320 and/or trained machine learning model(s) 332 can be executed and/or accelerated using one or more computer processors and/or on-device coprocessors. The on-device coprocessor(s) can include, but are not limited to one or more graphic processing units (GPUs), one or more tensor processing units (TPUs), one or more digital signal processors (DSPs), and/or one or more application specific integrated circuits (ASICs). Such on-device coprocessors can speed up training of machine learning system(s) 320 and/or generation of inference(s and/or prediction(s) 350 by trained machine learning model(s) 332. In some examples, trained machine learning model(s) 332 can be trained, reside and execute to provide inference(s) and/or prediction(s) 350 on a particular computing device, and/or otherwise can make inferences for the particular computing device.

In some examples, one computing device CD_SOLO can include trained machine learning model(s) 332, perhaps after performing the training of machine learning system(s) 320 on computing device CD_SOLO. Then, computing device CD_SOLO can receive inference/prediction request(s) 340 to provide inference(s) and/or prediction(s) 350 and can use trained machine learning model(s) 332 operating on input data 330 to responsively provide inference(s) and/or prediction(s) 350, where inference(s) and/or prediction(s) 350 can be provided using a user interface and/or a display, as one or more electronic communications, as one or more printed documents, etc.

In some examples, two or more computing devices CD_CLI and CD_SRV can be used to provide inference(s) and/or prediction(s) 350. For example, a first computing device CD_CLI can generate and send inference/prediction request(s) 340 to a second computing device CD_SRV. Upon reception of inference/prediction request(s) 340 from CD_CLI, CD_SRV can use trained machine learning model(s) 332, perhaps after performing the training of machine learning system(s) 320, to operate on input data 330 and responsively determine inference(s) and/or prediction(s) 350. After determining inference(s) and/or prediction(s) 350, CD_SRV respond to the requests from CD_CLI by providing inference(s) and/or prediction(s) 350 to CD_CLI.

Using depth-from-stereo techniques, depth of surfaces of objects captured in the dual pixel images can be estimated based on differences between pixels in the left side image 210 from pixels in the right side image 220. Depth-from-stereo techniques estimate a depth of a point in dual pixel image 200 based on how much that point appears to move between left side image 210 and right side image 220. However, finding these correspondences in dual pixel images 200 can be challenging because scene points barely move between left side image 210 and right side image 220. Further, depth-from-stereo techniques can involve overcoming an aperture problem. That is, viewing a scene through a small aperture can make it difficult, if not impossible, to find correspondence for lines parallel to the stereo baseline, i.e., the line connecting the two cameras. In other words, when looking at the vertical lines in dual pixel image 200, any proposed shift of these lines in one view with respect to the other view looks about the same. In addition, depth-from-stereo techniques do not account for optical effects like point spread function of the lens and ignores semantic cues that can be useful for estimating depth.

Depth-from-stereo can be improved upon based on an observation that a parallax cue is only one of many depth cues present in images, including semantic cues and defocus cues. In addition, even when viewing an image on a flat screen, humans can accurately tell how far things are because humans learn know the rough size of everyday objects, like people and buildings. Because a person in a selfie occupies more pixels than a background object, such as a building, a human viewing the selfie could infer that the person is closer to the camera than the building.

Designing a hand-crafted algorithm to combine exploit parallax cues, semantic cues, and perhaps other cues to estimate depth of objects captured in images, such as dual pixel images, can be difficult. However, a machine learning system can be trained and utilized to exploit semantic, traditional, and perhaps other cues to estimate depth of objects captured in dual pixel images. For example, a convolutional neural network can be trained and utilized to receive a dual pixel image as an input and subsequently generate a depth map estimating depths of objects captured in the dual pixel image.

Figure 4:
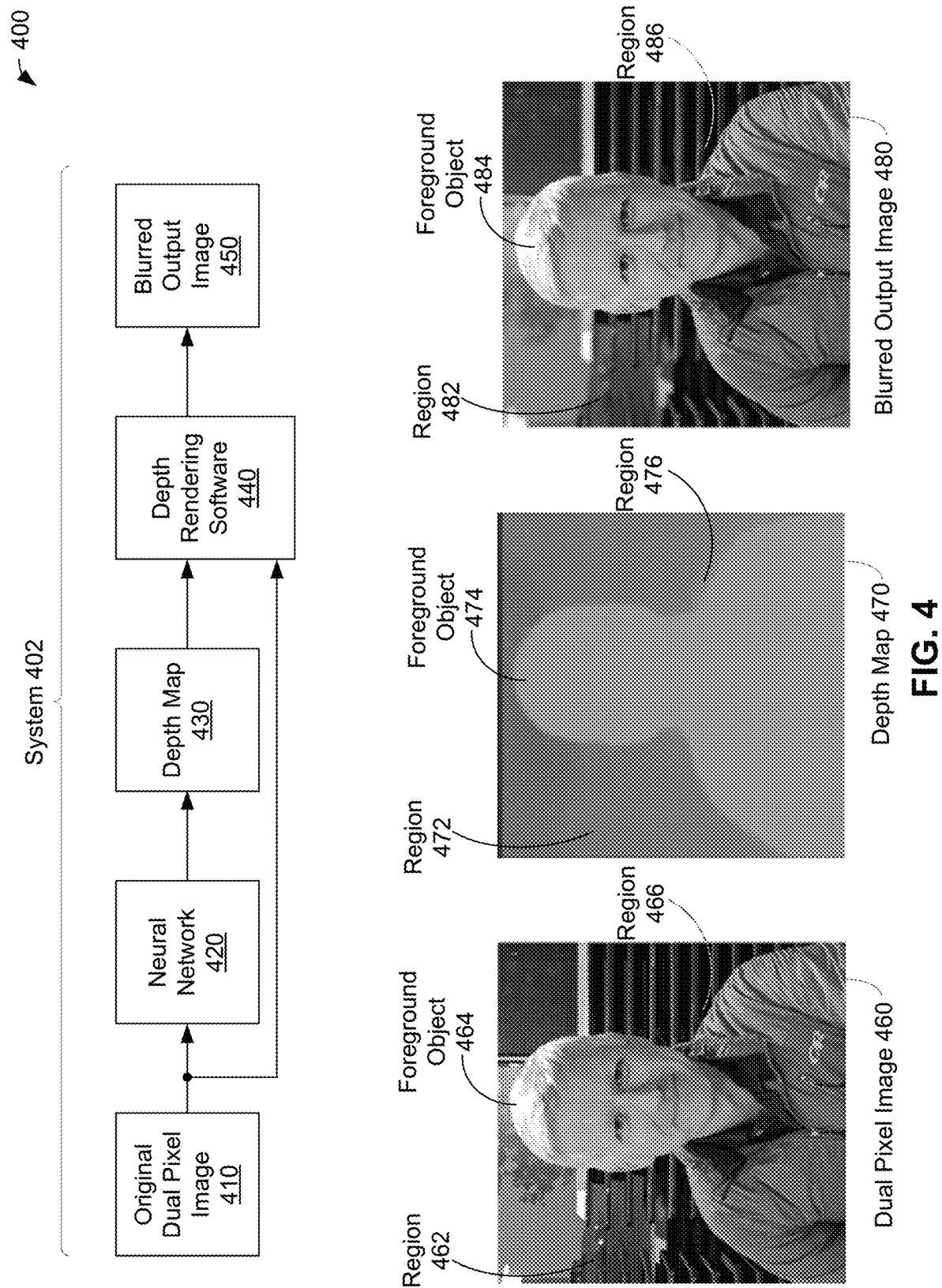
FIG. 4 is a diagram that includes a block diagram of a system for partially blurring images, in accordance with example embodiments.

FIG. 4 is a diagram that includes block diagram 400 of system 402 for partially blurring images, in accordance with example embodiments. System 402 can receive original dual pixel image 410 as an input. Original dual pixel image 410 can be provided to neural network 420, which can responsively generate depth map 430 for original dual pixel image 410. Original dual pixel image 410 and depth map 430 can be provided to depth rendering software 440, which can use depth map 430 to selectively blur original dual pixel image 410; e.g., by blurring background objects and not blurring foreground objects. That is, depth rendering software 440 can generate blurred output image 450 by selectively blurring original dual pixel image 410 using depth map 430.

Neural network 420 can be an example of machine learning system(s) 320 of system 300 discussed above in the context of FIG. 3. After training, the trained version of neural network 420 can be an example of trained machine learning model(s) 332. In this specific example, input data 330 of system 300 can include original dual pixel image 410, inference/prediction request(s) 340 of system 300 can include a request for a depth map for original dual pixel image 410, which can be a standalone request or part of a request to partially blur original dual pixel image 410, and inferences and/or prediction(s) 350 can include depth map 430 for original dual pixel image 410. Then, depth map 430 can be stored, communicated, and/or otherwise provided and/or can be used by depth rendering software 440 to produce output image 450.

FIG. 4 also shows dual pixel image 460, which depicts a person as foreground object 464 in front of a background that includes regions 462 and 466. In this example, dual pixel image 460 is provided to neural network 420 as an input; e.g., an instance of original dual pixel image 410.

Neural network 420 responsively generates depth map 470 for dual pixel image 460. In the illustration of depth map 470 in FIG. 4, lighter-colored pixels represent objects in an environment that are relatively close/nearer to a camera used to capture dual pixel image 460 in the environment and darker-colored pixels represent objects that are relatively far from the camera used to capture dual pixel image 460 in the environment. For example, foreground object 474 in depth map 470 is illustrated using lighter-colored pixels, indicating that foreground object 464 of dual pixel image 460 is relatively close to the camera used to capture dual pixel image 460. As another example, regions 472 and 476 of depth map 470 are both illustrated using darker-colored pixels, indicating that regions 462 and 466 of dual pixel image 460 are relatively far from the camera used to capture dual pixel image 460. Further, region 472 is illustrated using darker colored pixels than pixels used to illustrate region 476, indicating that objects depicted in region 462 of dual pixel image 460 are relatively far from the camera used to capture dual pixel image 460 in comparison to objects depicted in region 472 of dual pixel image 460.

This example continues with dual pixel image 460 and depth map 470 being provided to depth rendering software 440 with a request to blur only background objects of dual pixel image. Depth rendering software 440 then uses depth map 470 to generate blurred output image 480 by blurring pixels in dual pixel image 460 whose corresponding depth values in depth map 470 indicate those pixels depict background objects; e.g., depth rendering software 440 blurs pixels in dual pixel image 460 whose depth values of depth map 470 are depicted in FIG. 4 using darker-colored pixels.

Resulting blurred output image 480 shows foreground object 484 (corresponding to foreground object 464) with little or no blurring and shows region 482 (corresponding to region 462) with a relatively-large amount of blurring in comparison to region 486 (corresponding to region 466). The relatively-large amount of blurring in region 482 with respect to region 486 corresponds to depth values in depth map 470 generated by neural network 420 that determined that objects in region 462 of dual pixel image 460 are further from the camera used to take dual pixel image 460 than objects in region 466 of dual pixel image 460. That is, depth map 470 generated by neural network 420 enables non-uniform blurring of background objects by depth rendering software 440. Further, depth map 470 generated by neural network 420 has fewer errors than traditional techniques (e.g., uniform blurring of background objects) and so enables depth rendering software 440 to provide a more natural and pleasing depth-dependent blur to background objects in blurred output image 480.

During training, neural network 420 can receive training images, including images with dual pixel depth data, to produce estimated depth maps, such as depth map 430. For example, neural network 420 can be trained on a relatively-large dataset (e.g., 50,000 or more) of training images. The dataset of training images can include dual pixel images obtained by a device using one camera or by a multi-camera device, such as the multi-camera device described herein.

In some examples, the training images used to train neural network 420 can include one or more dual pixel images of at least a foreground object, where a dual pixel image can include a plurality of dual pixels. A dual pixel of the plurality of dual pixels can include a left-side pixel and a right-side pixel that both represent light incident on a single dual pixel element (such as left side pixel 124a and right side pixel 124b generated by dual pixel element 134c discussed above) used to capture the dual pixel image.

In other examples, a dual pixel element can provide dual pixels can have other orientations than left and right; e.g., some dual pixel sensors can provide upper and lower pixels rather than left-side and right-side pixels. In other examples, a dual pixel element can provide more than two sub-pixels per image pixel.

Neural network 420 can be trained to determine a depth map associated with the dual pixel image(s). After being trained, neural network 420 can be provided, such as discussed above in the context of FIG. 3 regarding providing trained machine learning model(s) 332. In some examples, objects in the dual pixel image(s) can be classified based on object types; e.g., one or more object types for plants, one or more object types for buildings, one or more object types for landscapes, one or more object types for animals, one or more object types for persons, including one or more object types for faces of persons. In some of these examples, the training images used to train neural network 420 can include one or more dual pixel images can include images with foreground objects having one or more specified object types; e.g., images of people, images of faces of people, images of buildings, etc.

An estimated depth map generated by neural network 420 can be evaluated (e.g., during training) using one or more loss functions. The loss function(s) can evaluate estimated depth data and/or estimated depth maps generated by neural network 420 with respect to ground-truth depth data. The loss function(s) can be invariant to depth ambiguities in the dual pixel data and so enable the neural network to learn from the ground-truth depth data. As an example of depth ambiguities, two images of different scenes with different depths can produce the same set of dual pixel images if the focus distance or lens characteristics, e.g., the lens tilt, also change between the captures. These lens characteristics can vary from device to device. This means that a given dual pixel pair can correspond to a range of different depth maps; i.e., depth can be predicted only up to an unknown scale and offset. The herein-described loss functions can be invariant to scale and offset values so not to penalize the neural network as long as the prediction is in the range of the depth maps possible for the given dual pixel pair. The depth maps provided by trained neural network 420 can preserve the relative ordering of objects in the scene.

Then, neural network 420 can be evaluated during training using one or more of Equations (1), (2), (3), and (4) described below as loss functions; that is, one or more of Equations (1), (2), (3), and (4) can be used to evaluate correctness of depth maps generated by neural network 420 in comparison to ground truth depth data.

To describe these loss functions, let $f(I)$ be a function representing a predicted depth map generated by neural network 420 while being trained to operate on dual pixel data input I Let G represent a ground truth depth map associated with dual pixel data input I. For example, ground truth depth map G can be a depth map generated using the herein-described multi-camera device. To train neural network 420 properly, the predicted depth map $f(I)$ should be as close to ground truth depth map G as possible. This requirement can be represented by Equation (1) below, which can perform as a loss function to be minimized during training of neural network 420:

$$\sum_I \|f(I) - G\|^2 \quad (1)$$

Equation (1) indicates that a difference between prediction $f(I)$ and ground truth G is taken at every pixel of input I and that difference is squared and summed over the entire input I.

However, Equation (1) does not account for the fact that dual pixel input data I is dependent not only on the depth of the scene but also on additional factors, such as, but not limited to, focus distance of a camera lens used to capture I, a point spread function of the camera lens, and/or camera aperture. Due to these additional factors, it is possible to have two different ground truths G and G' that yield the same dual pixel data I. Since neural network 420 is deterministic and only takes one input I, neural network 420 cannot produce both G and G' using the same input I. In fact, if training data for neural network 420 has both (I,G) and (I,G') pairs, using Equation (1) as a loss function will cause NN1 to predict a depth map that averages G and G', which would be incorrect.

Another loss function for neural network 420 can be determined by assuming a thin lens model under which G and G' are related by an affine mapping shown in Equation (2), $$G' = aG + b \quad (2)$$

where a and b are scalar values that depend on the additional factors mentioned above; e.g., focus length, point spread function, and/or camera aperture.

Equation (3) expresses a loss function that is based on the affine mapping of Equation (2):

$$\min_{a,b} \sum_I \|af(I) + b - G\|^2 \quad (3)$$

Like Equation (1), Equation (3) computes a per pixel difference that is squared and summed over input I. However, in Equation (3), predicted depth map f(I) is modified by the affine mapping of Equation (2), where a and b are scalar values chosen to give a smallest per pixel difference that is squared and summed over input I. That is, Equation (3) assumes that neural network 420 can only predict depth up to an unknown affine transform, since neural network 420 is unable to distinguish between G and G' given the same dual pixel data I. In cases where neural network 420 is trained on both (I,G) and (I,G') a loss function based on Equation (3) can be set to zero for both (I,G) and (I,G') cases that have having the same prediction f(I). While there are limitations to using Equation (3); e.g., exact depth values cannot not be determined, a neural network trained using a loss function based on Equation (3) can provide useful depth information; e.g., relative ordering of depths is preserved. Also, Equation (3) can be computed efficiently since a minimization problem presented by Equation (3) has a closed form solution.

Further, Equation (3) can be modified to incorporate per pixel confidences for the ground truth W, leading to Equation (4):

$$\min_{a,b} \sum_{I} \|W \circ af(I) + b - G\|^2 \quad (4)$$

where the ° in Equation (4) denotes per element multiplication.

Figure 5:
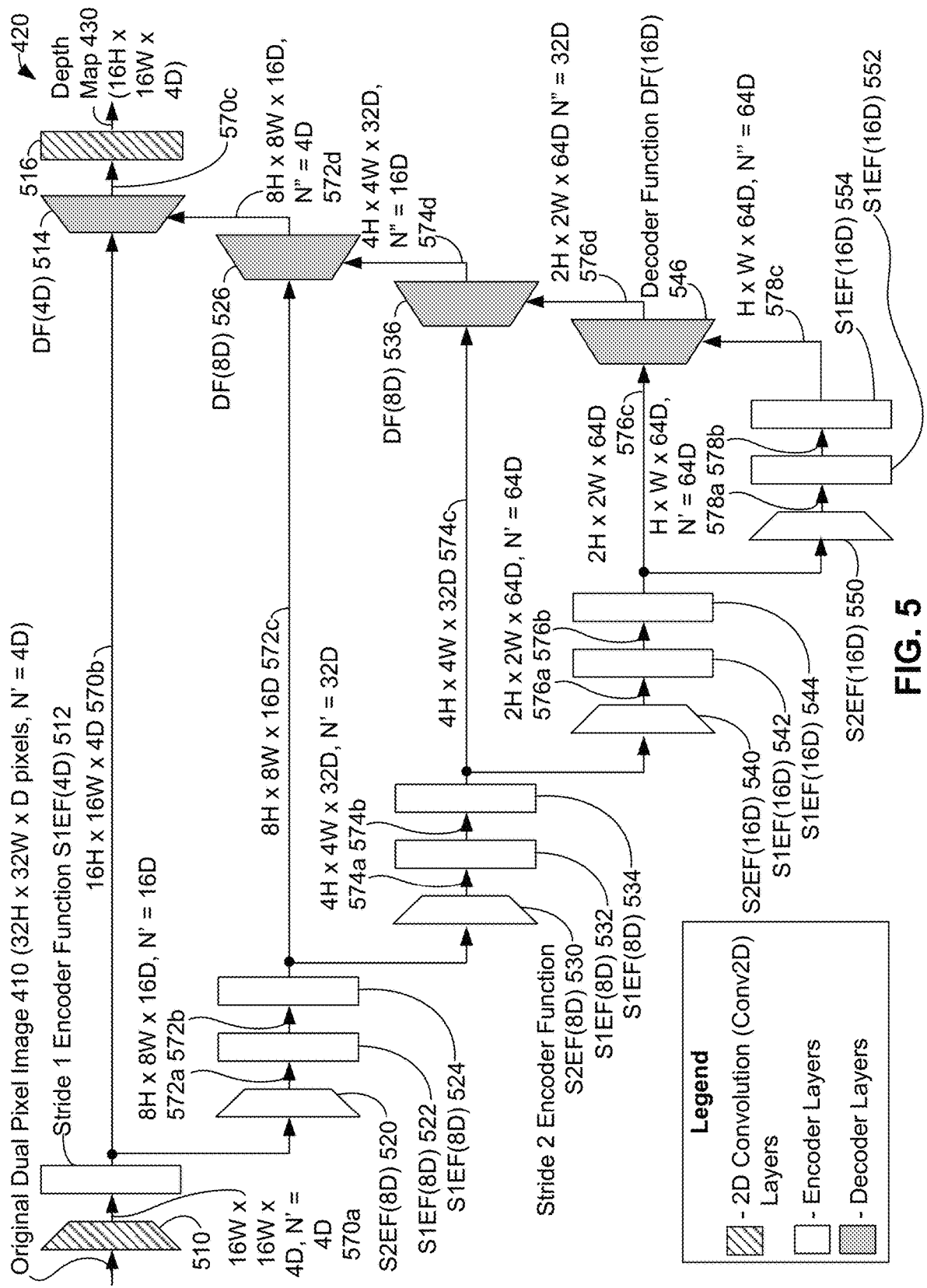
FIG. 5 illustrates a neural network of the system of FIG. 4, in accordance with example embodiments.

FIG. 5 illustrates neural network 420 of system 402, in accordance with example embodiments. Neural network 420 can be a convolutional encoder-decoder neural network. In FIG. 5, as indicated in by a legend shown at lower left, encoder layers of neural network 420 are shown in white, decoder layers are shown in grey, and two-dimensional (2D) convolutional (Conv2D) layers are shown filled with diagonal lines. In some examples, part or all of neural network 420 can be implemented using specialized hardware and/or software designed for neural networks; e.g., specialized neural network circuitry, software libraries with software supporting neural networks.

As indicated above, neural network 420 can receive original dual pixel image 410 as an input and responsively generate depth map 430 for original dual pixel image 410 as an output. In the context of FIG. 5, original dual pixel image 410 can be input as a three-dimensional (3D) array of pixels—this three-dimensional array of pixels is represented at upper left of FIG. 5 as "32 H×32 W×D" pixels, with the value of a parameter N' set equal to "4 D". In the context of neural network 420, depth map 430 is a three-dimensional array of depth values—this three-dimensional array of depth values is represented at upper right of FIG. 5 as "16 H×16 W×4 D" for depth map 430.

In the description of neural network 420, H is a positive integer associated with a number of horizontal pixels (or rows of pixels) in original dual pixel image 410, W is a positive integer associated with a number of vertical pixels (or columns of pixels) in original dual pixel image 410, D is a positive integer representing a number of pixels used for depicted pixel in original dual pixel image 410, and N' and N" are positive integer parameters. In one specific example, H=32, W=42, and D=2—that is, original dual pixel image 410 is an array having 1024 rows×1344 columns×2 pixels (i.e., dual pixels) and corresponding depth map 430 has 512 rows×672 columns×8 depth values. In some examples, neural network 420 is trained on dual pixel images only and so inputs to neural network 420 (such as original dual pixel image 410) include images where D=2. In other examples, other values of H, W, and/or D are possible.

During operation of neural network 420, original dual pixel image 410 can be received at Conv2D layers 510. Conv2D layers 510 can perform a 2D convolution on original dual pixel image 410 to generate 16 H×16 W×4 D array of values 570a. 16 H×16 W×4 D array of values 570a can be provided as an input to stride 1 encoder function (S1EF) 512. FIG. 5 indicates that S1EF 512 is invoked with an input parameter of 4 D and with parameter N' equal to 4 D to perform a stride 1 encoder operation on 16 H×16 W×4 D array of values 570a.

Figure 6A:
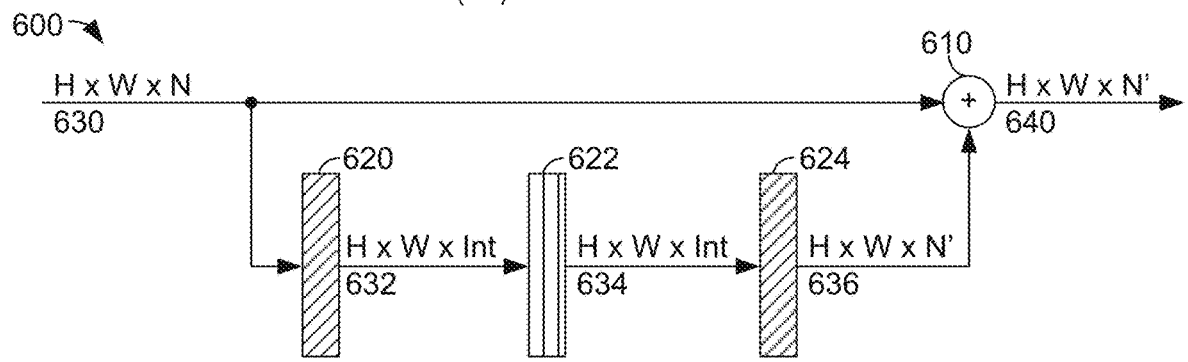
FIG. 6A illustrates an encoder function of the neural network of FIG. 5, in accordance with example embodiments.

FIG. 6A illustrates a stride 1 encoder function 600 that neural network 420 can use to perform stride 1 encoder operations, in accordance with example embodiments. For example, stride 1 encoder function 600 can be used to implement some or all of S1EF 512, S1EF 522, S1EF 524, S1EF 532, S1EF 534, S1EF 542, S1EF 544, S1EF 552, and S1EF 554.

Stride 1 encoder function 600 can be invoked with one input parameter "Int" to perform a stride 1 encoder operation on an input H×W×N array of values 630. Upon invocation, stride 1 encoder function 600 can provide H×W×N array of values 630 to both Conv2D layers 620 and to addition+ parametric rectifier linear unit (APReLU) 610. Conv2D layers 620 can perform a 2D convolution on H×W×N array of values 630 with stride 1 to generate H×W×Int array of values 632. H×W×Int array of values 632 can be provided to separable 2D convolution layers 622, which can perform a separable 2D convolution on H×W×Int array of values 632 to generate H×W×Int array of values 634. H×W×Int array of values 634 can be provided to Conv2D layers 624, which can perform a 2D convolution on H×W×Int array of values 634 to generate H×W×N' array of values 636. Then, APReLU 610 can perform an addition and parametric linear unit operation on both H×W×N array of values 630 and H×W×N' array of values 636 to generate H×W×N' array of values 640. Then, H×W×N' array of values 640 can be output by stride 1 encoder function 600.

Returning to FIG. 5, the output of S1EF 512 can be 16 W×16 W×4 D array of values 570b, which can be provided both to stride 2 encoder function (S2EF) 520 and to decoder function (DF) 514 (i.e., as a skip connection). FIG. 5 shows that S2EF 520 can be invoked with an input parameter of 8 D and with parameter N' equal to 16 D to perform a stride 2 encoder operation on 16 W×16 W×4 D array of values 570b.

Figure 6B:
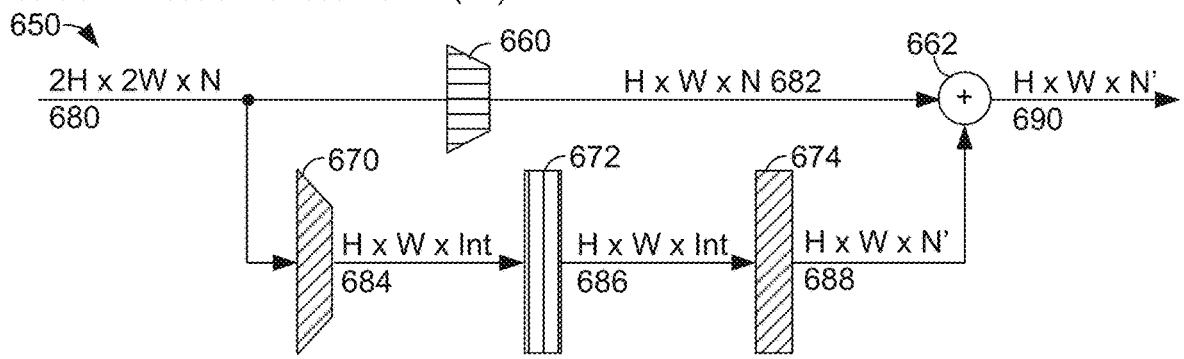
FIG. 6B illustrates another encoder function of the neural network of FIG. 5, in accordance with example embodiments.

FIG. 6B illustrates stride 2 encoder function S2EF 650 that neural network 420 can use to perform stride 2 encoder operations, in accordance with example embodiments. For example, stride 2 encoder function 650 can be used to implement some or all of S2EF 520, S2EF 530, S2EF 540, and S2EF 550.

Stride 2 encoder function 650 can be invoked with one input parameter "Int" to operate on an input 2 H×2 W×N array of values 680. Upon invocation, stride 2 encoder function 650 can provide 2 H×2 W×N array of values 680 to both maximum pooling (MaxPool) layers 660 and Conv2D layers 670. MaxPool layers 660 can perform a maximum pooling operation on 2 H×2 W×N array of values 680 to generate H×W×N array of values 682. Conv2D layers 620 can perform a 2D convolution with stride 2 on H×W×N array of values 680 to generate H×W×Int array of values 684. H×W×Int array of values 684 can be provided to separable 2D convolution layers 672, which can perform a separable 2D convolution on H×W×Int array of values 684 to generate. H×W×Int array of values 686. Then, H×W×Int array of values 686 can be provided to Conv2D layers 674, which can perform a 2D convolution on H×W×Int array of values 686 to generate H×W×N' array of values 688. Both H×W×N array of values 682 and H×W×N' array of values 688 can be provided to APReLU 662. APReLU 662 can perform an addition and parametric linear unit operation on both H×W×N array of values 682 and H×W×N' array of values 688 to generate H×W×N' array of values 690. Then, H×W×N' array of values 690 can output by stride 2 encoder function 650.

Returning to FIG. 5, the output of S2EF 520 can be 8 H×8 W×16 D array of values 572a. Then, S1EF 522 can be invoked with an input parameter of 8 D and with parameter N' equal to 16 D to perform a stride 1 encoder operation on array of values 572a to generate 8 H×8 W×16 D array of values 572b. S1EF 524 can be invoked with an input parameter of 8 D and with parameter N' equal to 16 D to perform a stride 1 encoder operation on array of values 572*b* to generate 8 H×8 W×16 D array of values 572*c*. Array of values 572*c* can be provided both to S2EF 530 and to DF 526 (i.e., as a skip connection).

S2EF 530 is invoked with an input parameter of 8 D and with parameter N' equal to 32 D to perform a stride 2 encoder operation on 8 H×8 W×16 D array of values 572*c*. The output of S2EF 530 is 4 H×4 W×32 D array of values 574*a*. Then, S1EF 532 can be invoked with an input parameter of 8 D and with parameter N' equal to 32 D to perform a stride 1 encoder operation on array of values 574*a* to generate 4 H×4 W×32 D array of values 574*b*. S1EF 534 can be invoked with an input parameter of 8 D and with parameter N' equal to 32 D to perform a stride 1 encoder operation on array of values 574*b* to generate 4 H×4 W×32 D array of values 574*c*. Array of values 574*c* can be provided to S2EF 540 and to DF 536 (i.e., as a skip connection).

S2EF 540 can be invoked with an input parameter of 16 D and with parameter N' equal to 64 D to perform a stride 2 encoder operation on 4 H×4 W×32 D array of values 574*c*. The output of S2EF 540 can be 2 H×2 W×64 D array of values 576*a*. Then, S1EF 542 can be invoked with an input parameter of 16 D and with parameter N' equal to 64 D to perform a stride 1 encoder operation on array of values 576*a* to generate 2 H×2 W×64 D array of values 576*b*. S1EF 544 can be invoked with an input parameter of 16 D and with parameter N' equal to 64 D to perform a stride 1 encoder operation on array of values 576*b* to generate 2 H×2 W×64 D array of values 576*c*. Array of values 576*c* can be provided to S2EF 550 and to DF 546 (i.e., as a skip connection).

S2EF 550 can be invoked with an input parameter of 16 D and with parameter N' equal to 64 D to perform a stride 2 encoder operation on 2 H×2 W×64 D array of values 576*c*. The output of S2EF 550 can be H×W×64 D array of values 578*a*. Then, S1EF 552 can be invoked with an input parameter of 16 D and with parameter N' equal to 64 D to perform a stride 1 encoder operation on array of values 578*a* to generate H×W×64 D array of values 578*b*. S1EF 554 can be invoked with an input parameter of 16 D and with parameter N' equal to 64 D to perform a stride 1 encoder operation on array of values 578*b* to generate H×W×64 D array of values 578*c*.

Array of values 578*c* can be provided to DF 546. FIG. 5 indicates that DF 546 can be invoked with an input parameter of 16 D, parameter N' equal to 64 D, and parameter N" equal to 64 D to perform a decoder operation on array of values 576*c* and array of values 578*c*.

Figure 7:
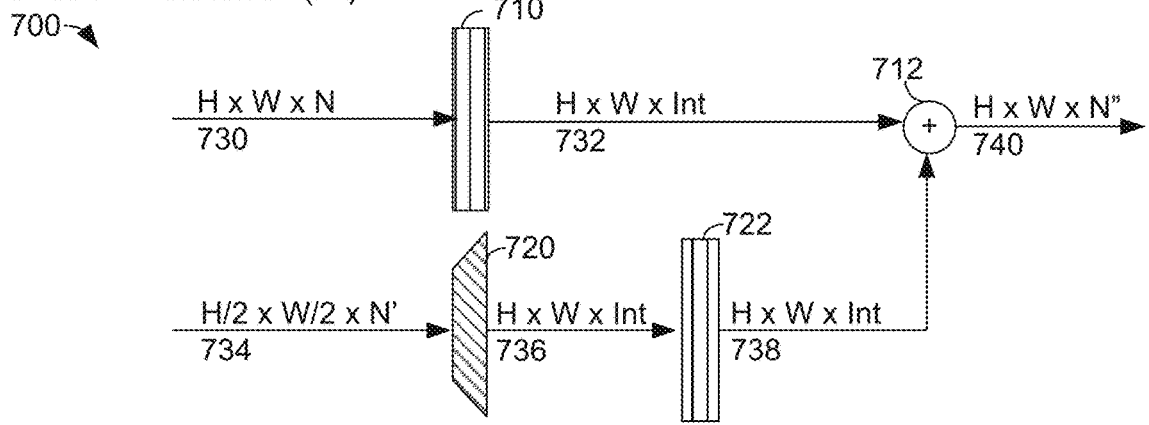
FIG. 7 illustrates a decoder function of the neural network of FIG. 5, in accordance with example embodiments.

FIG. 7 illustrates a decoder function 700 that neural network 420 can use to perform decoder operations, in accordance with example embodiments. For example, decoder function 700 can be used to implement some or all of DF 514, DF 526, DF 536, and DF 546.

Decoder function 700 can be invoked with one input parameter "Int" to perform decoder on two input arrays of values: H×W×N array of values 730 and H/2×W/2×N' array of values 734. Upon invocation, decoder function 700 can provide H×W×N array of values 730 to separable 2D convolution layers 710, which can perform a separable 2D convolution on array of values 730 to generate H×W×Int array of values 732. Decoder function 700 can provide W/2×N' array of values 734 to transpose 2D convolution layers 720, which can perform a transpose 2D convolution on array of values 734 to generate H×W×Int array of values 736. Separable 2D convolution layers 722 can perform a separable 2D convolution on H×W×Int array of values 736 to generate. H×W×Int array of values 738. APReLU 610 can perform an addition and parametric linear unit operation on both H×W×Int array of values 732 and H×W×Int array of values 738 to generate H×W×N" array of values 740. Then, H×W×N" array of values 740 can be output by decoder function 700.

Returning to FIG. 5, the output of DF 546 can be 2 W×2 W×64 D array of values 576*d*, which can be provided to DF 536. DF 536 can be invoked with an input parameter of 8 D, parameter N' equal to 32 D, and parameter N" equal to 32 D to perform a decoder operation on array of values 574*c* and array of values 576*d*. The output of DF 536 can be 4 W×4 W×32 D array of values 574*d*, which can be provided to DF 526.

DF 526 can be invoked with an input parameter of 8 D, parameter N' equal to 16 D, and parameter N" equal to 16 D to perform a decoder operation on array of values 572*c* and array of values 574*d*. The output of DF 526 can be 8 W×8 W×16 D array of values 572*d*, which can be provided to DF 514.

DF 514 can be invoked with an input parameter of 4 D, parameter N' equal to 4 D, and parameter N" equal to 4 D to perform a decoder operation on array of values 570*b* and array of values 572*d*. The output of DF 514 can be 16 W×16 W×4 D array of values 570*c*, which can be provided to Conv2D layers 516. Conv2D layers 516 perform a 2D convolution of 16 W×16 W×4 D array of values 570*c* to generate a 16 W×16 W×4 D array of values that make up depth map 430. Then, depth map 430 can be output from neural network 420; e.g., for use by depth rendering software 440 as discussed above.

Example Multi-Camera Device

Figure 8A:
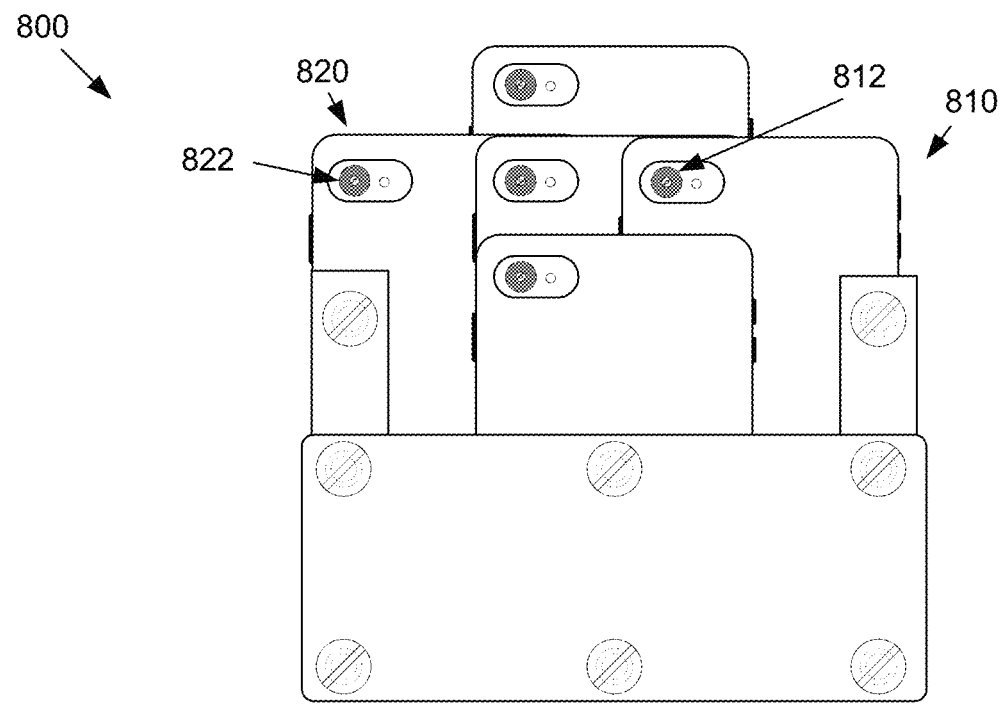
FIG. 8A illustrates a multi-camera device, in accordance with example embodiments.

FIG. 8A illustrates multi-camera device 800 that can obtain multiple dual pixel images of an object at different viewpoints; e.g., to provide ground-truth depth data to train neural network 420. Multi-camera device 800 can contain multiple mobile computing devices, for example, mobile computing device 810 and mobile computing device 820, each equipped with a camera that can take dual pixel images, for example, mobile camera 812 and mobile camera 822. The resulting dual pixel images, which may be used as training data for neural network 420, are similar to dual pixel images taken using the same or similar types of cameras on other mobile computing devices; e.g., user's mobile computing devices.

Mobile computing devices in multi-camera device 800 can be physically joined together as part of a single structure with various methods, such as screws, or adhesives. Some or all of the mobile computing devices in multi-camera device 800 can be spaced in a systematic fashion to ensure that each mobile computing device captures a different viewpoint of an object. For example, multi-camera device 800 can be arranged such that four cameras are spaced around a center camera with respect to the XY plane (i.e., cameras spaced in the up/down/left/right direction, each camera containing small baselines to the center camera). As a result, mobile computing device 810 can capture the left side viewpoint and mobile computing device 820 can capture a right side viewpoint. As noted above, the use of different viewpoints eliminates the aperture problem because there is parallax in multiple directions. Capturing images from (slightly) different viewpoints also ensure that a point in an image can be visible in at least one other image, resulting in fewer points with no correspondences. Once multiple dual pixel images of an object are taken by multi-camera device 800, structure from motion and multi view stereo techniques can be used to compute high-quality depth maps from the captured dual pixel images. As such, the use of multi-camera device 800 can lead to high-quality depth maps, which can then serve as ground-truth depth maps in training neural network 420.

Acquiring high-quality depth maps using structure from motion and multi-view stereo techniques can involve using multi-camera device 800 to simultaneously capture images of an object from each of the viewpoints (i.e. each of the cameras on multi-camera device 800). Without tight time synchronization between the cameras, an object in the images can move and/or lighting can change between captured images, which could degrade the quality of a resulting ground truth depth map. For example, mobile camera 812 may capture a first viewpoint of object A at time T and, from camera delay, mobile camera 822 may capture a second viewpoint of object A at time T+100 ms. Even with such a small delay as 100 ms, capturing the second viewpoint at T+100 ms may present an entirely different image environment for object A than at time T.

One approach for capturing synchronized photos with multiple cameras is to use specialized devices configured with wired hardware triggers with fixed locations. However, this approach can necessitate specialized wiring and other heavy equipment that cannot easily be moved around, limiting the types of objects that can be captured by multi-camera device 800 and degrading the quality of a dataset. More importantly, in order for neural network 420 to effectively predict depth maps, it is useful for multi-camera device 800 to collect training data from mobile computing devices that are representative of devices that will use of neural network 420. For example, mobile computing devices 810 and 820 of multi-camera device 800 can be mobile computing devices that would typically make use of neural network 420 (e.g. off-the-shelf smart phones).

Yet, approaches that utilize representative mobile computing devices can face difficultly resolving hardware/software delays that occur on each of the devices. For example, synchronization methods using the audio port of mobile computing devices (e.g. selfie stick triggers) can face variable delays on the order of 100 ms. Other approaches, including using an audio waveform, Bluetooth™ communications, and GPS can exhibit similar high variable delays.

Herein is described an approach that uses representative mobile computing devices to capture synchronized data with no additional hardware and without hardware/software delays. For example, such an approach can include a multi-camera framework to resolve network delays between each of the mobile computing devices and resolve operation system delays within each mobile computing device.

Figure 8B:
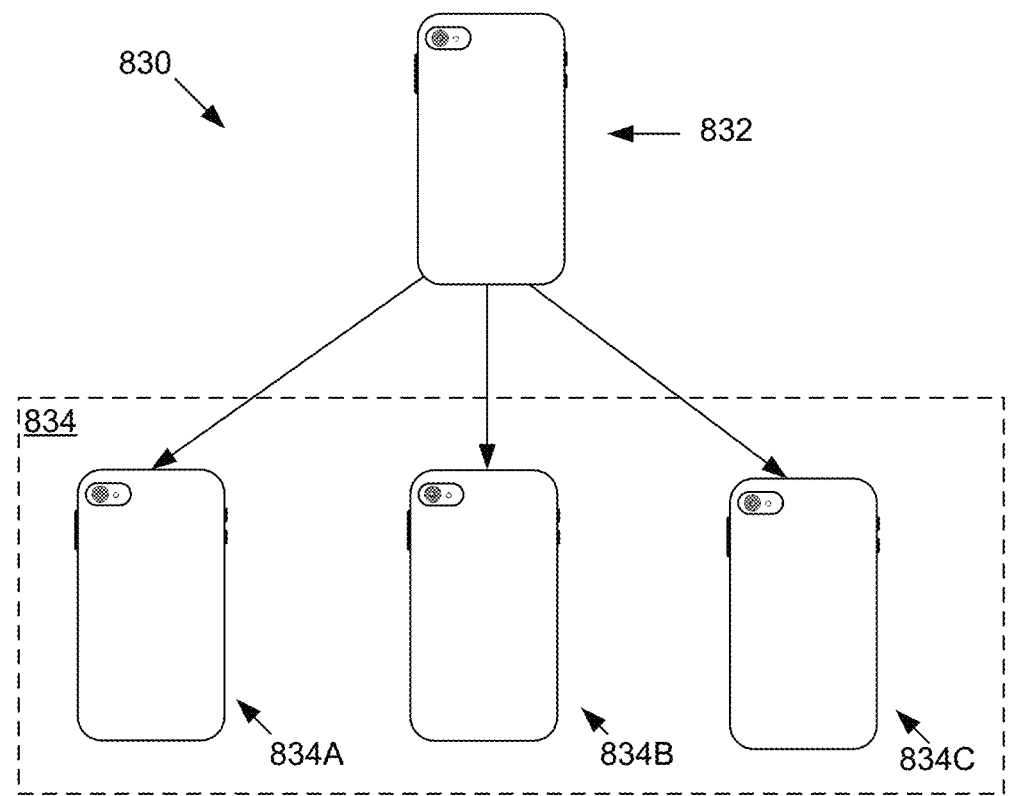
FIG. 8B further illustrates the multi-camera device of FIG. 8A, in accordance with example embodiments.

FIG. 8B illustrates an arrangement of mobile computing devices in multi-camera device 800 to facilitate multi-camera framework 830. Multi-camera framework 830 can include a single master device 832 and multiple client devices 834, for example, client device 834A, client device 834B, and client device 834C. Rather than interacting with each device on multi-camera device 800, master device 832 can broadcast commands to client devices 834 to obtain dual pixel images Master device 832 can be designated from among devices of multi-camera device 800 based on a physical location of the each of the devices on multi-camera device 800 (e.g., the device at the top-left of multi-camera device 800 can be designated as the master device) and/or through user selection. For example, a user selection may include specifying a master device by interacting with an interface of a device on multi-camera device 800. Upon designation, master device 832 can be configured to act as a WiFi™ hotspot for connecting with client devices 834. Alternatively, devices of multi-camera device 800 can connect to an independent WiFi™ router, which can automatically designate master device 832. In some examples, a master device for multi-camera framework 830 is selected only once per an image collection session.

To begin communication, master device 832 and client devices 834 can use standard network protocols, for example, Transmission Control Protocol (TCP) or WiFi™ protected access 2 (WPA2), to establish communication links between master device 832 and each of client devices 834. Once the connections are made, master device 832 and client devices 834 can communicate over a modified Network Time Protocol (NTP) synchronization to estimate network and operating system delays. These delays can determine correct time offsets for client devices 834 to add in order to synchronize to the clock of master device 832.

Figure 9:
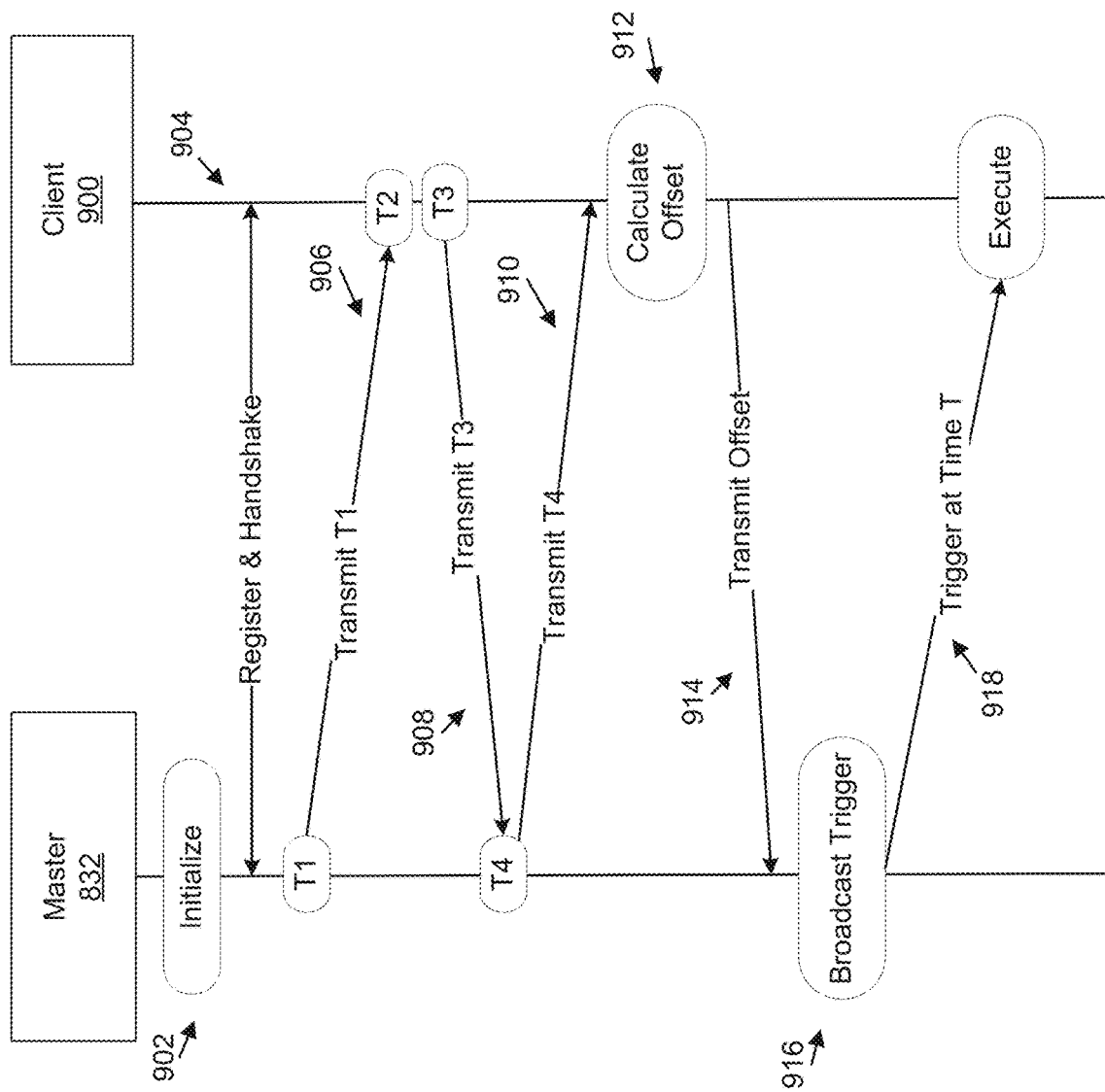
FIG. 9 is a message flow diagram illustrating a protocol for synchronizing clocks of the multi-camera device of FIG. 8A, in accordance with example embodiments.

FIG. 9 is a message flow diagram illustrating a protocol for synchronizing clocks of the multi-camera device 830, in accordance with example embodiments. The protocol can begin at block 902. At block 902, master device 832 is selected and the communication mechanism (e.g., WiFi™ hotspot, WiFi™ router) is established. At block 906, master device 832 determines a time, records that time in timestamp T1 and sends timestamp T1 to client device 900, which arrives at client devices 900 at a time recorded in timestamp T2. Accordingly, the delay from master device 832 to client device 900 can be calculated as a difference in times recorded in timestamp T1 and T2; e.g., T2−T1. Letting O represent the offset between master device 832 and client device 900 and letting D represent the transit time of a message between master device 832 and client device 900, T2−T1 can be determined as O+D.

At 908, client device 900 determines a timestamp T3 and sends timestamp T3 to master device 832, which arrives at master device 832 at timestamp T4. At 910, master device 834 sends timestamp T4 to client device 900. Accordingly, the delay from client device 834 to master device 832 can be calculated as T4−T3, which can be determined as −O+D. At block 912, client device 900 makes use of the above relationships to determine the correct offset value O. Client device 900 then uses the offset value O to synchronize its clock with master device 832. At 914, client device 900 transmits the offset value O to master device 832.

At block 916, a broadcast trigger is provided by master device 832 (e.g., the broadcast trigger is provided in response to clicking a button to capture a dual pixel image). At 918, master device 832 broadcasts a future trigger time T to client device 900 (e.g., execute the trigger at 500 ms in the future). Client device 900 then waits until time T to invoke the trigger.

Notably, client device 900 is used for the purpose of example. Client device 900 can be embodied by any device of client devices 834. Moreover, blocks 902-914 can be concurrently implemented across all client devices 834 such that master device 832 can receive calculated offsets for all client devices 834. Thus, as a result of receiving calculated offsets from all client devices 834, master device 832 can set future trigger time T to be greater than the maximum client offset in order to allow for network delay. As an example calculation, suppose the maximum client offset is determined to be 550 ms. Thus, the value of future trigger time T may be set such that T>550 ms. As such, since the clocks of client devices 834 are synchronized to master device 832, all triggers can execute at the same future time T and so all of client devices 834 can capture of an scene simultaneously, and so capture a set of synchronized images of the scene.

In some examples, devices of multi-camera device 800 can use hardware timestamping; however, hardware timestamping can necessitate use of specialized hardware and operating systems on the client devices. Thus, in order maintain representative devices on multi-camera device 800, in some examples, the above procedure can utilize software timestamping For example, client devices 834 can periodically send heartbeat messages to master device 832 to update offsets as clocks drifts and network latency varies as part of software timestamping.

Yet, even with synchronization of clocks in multi-camera device 800 as illustrated in FIG. 9, a variable delay can exist between a request to capture a dual pixel image and a camera's response to such request. This delay can occur due to the operating system of the client device; e.g., while handling concurrent tasks.

Repeating requests can be utilized to resolve the operating system delay. With repeating requests, an operating system of a client device can deliver a set of request parameters (e.g., parameters to request a dual pixel image) to the camera once and have these parameters saved by the camera's hardware. The camera can then periodically capture dual pixel images with little variation capture frequency until the request is cancelled. This can prevent the operating system from consistently delaying every new dual pixel image request.

In some examples, there may be a variable delay introduced by the operating system when the request parameters are first delivered to the camera's hardware. However, this variable delay can be resolved by pushing the periodic image sequence to align to a specific phase by sampling: while the phase of the image sequence is greater than a desired threshold, issue another repeating request and try again.

Figure 10:
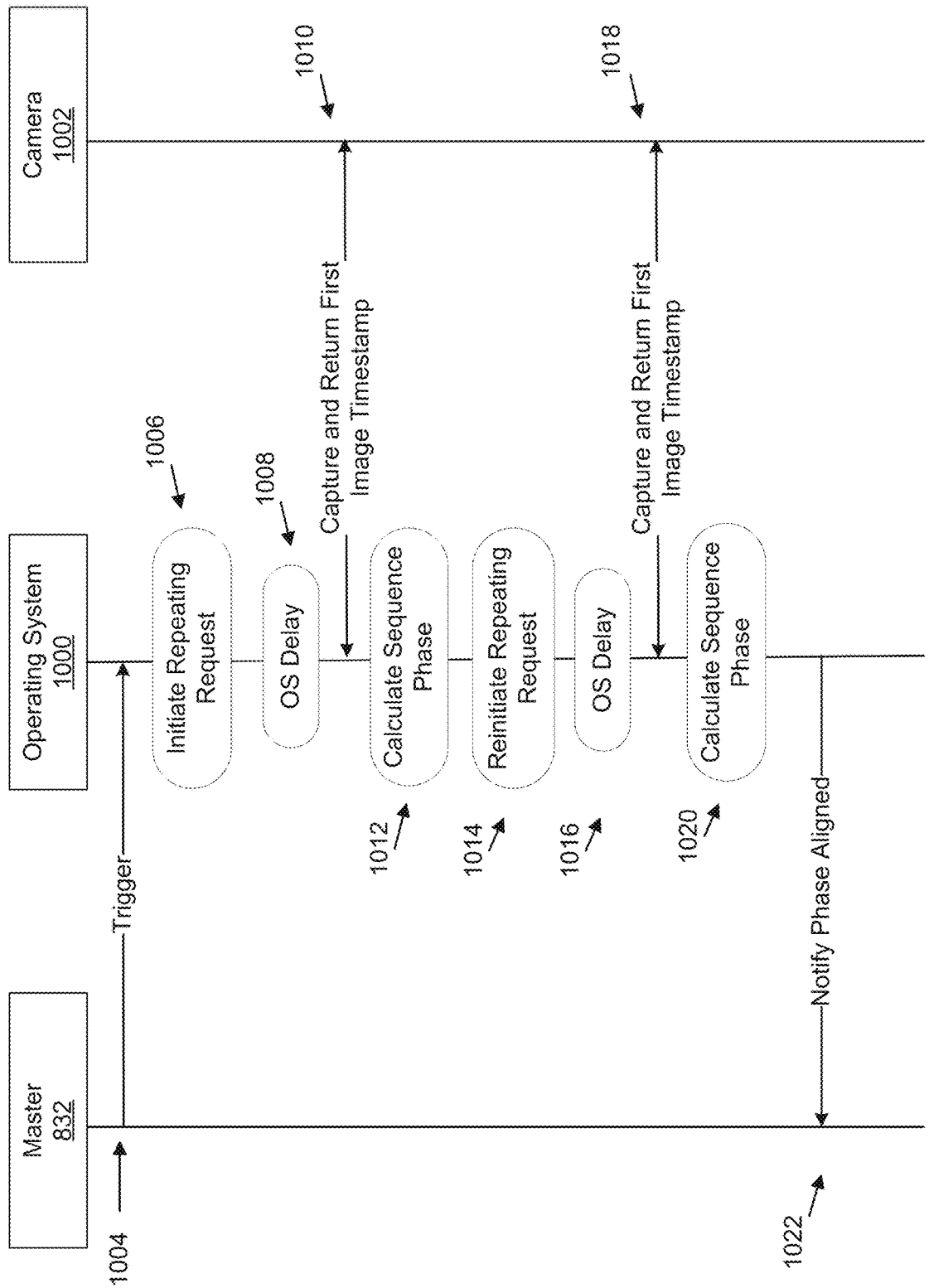
FIG. 10 is a message flow diagram illustrating a procedure using repeating requests by the multi-camera device of FIG. 8A, in accordance with example embodiments.

FIG. 10 is a message flow diagram illustrating a procedure using repeating requests by multi-camera device 830, in accordance with example embodiments. The procedure can begin at 1004. At 1004, master device 832 of multi-camera device 830 can issue a trigger request to operating system 1000 of a client device to capture an image. The trigger request can contain a desired exposure time E, a desired phase of the image sequence D, a desired synchronization precision P, and/or other parameters. At block 1006, operating system 1000 can generate a repeating request and send the repeating request to camera 1002. For example, the repeating request can contain the desired exposure time E and perhaps other parameters. At block 1008, the repeating request may be delayed by operating system 1000 (e.g., while operating system 1000 is performing other tasks). At step 1010, the repeating request can be received by camera 1002, which acts on the repeating request and begins periodically capturing images. At 1010, camera 1002 can send a first image timestamp T_1 (indicating the time the first image in the sequence is captured) back to operating system 1000. At block 1012, operating system 1000 may calculate a sequence phase to determine a relative offset from which images are periodically captured. For example, an exposure time E=50 ms with images captured at A_1 50 ms, A_2=100 ms, A_3=150 ms may have a sequence phase S=0. In another example, an exposure time E=50 ms with images captured at B_1=75 ms, B_2=125 ms, B_3=175 ms, and may have a sequence phase S=25. Thus, supposing that an example image is captured at time A with exposure time E, sequence phase S may be determined as S=A−E*k, wherein k is an integer for which |A−E*k| is at a minimum.

As an example calculation of the sequence phase at block 1012, suppose operating system 1000 issued a repeating request at time T_0=0 with exposure time E=50 ms, a desired synchronization precision P=10 ms, and suppose first time timestamp has a time T_1=75 ms (thus, a second image arrives at T_2=125 ms and a third image arrives at T_3=175 ms). Thus, delay of operating system 1000 can be calculated as T_1−E=75 ms−50 ms=25 ms. If the desired phase D=0 and exposure time E=50 ms, then the repeating request may have a sequence phase of 75 ms−50 ms=25 ms, which is greater than the desired synchronization precision P=10 ms. Namely, a suitable sequence phase would be within the range D−P to D+P.

At block 1014, upon determining that the sequence phase is greater than the desired precision, operating system 1000 can reinitiate the repeating request with camera 1002. At block 1016, the reinitiated repeating request may again be delayed by operating system 1000. At block 1018, the repeating request is received by camera 1002, which acts on the repeating request and begins to periodically capture images. Camera 1002 sends a first image timestamp X_1 (indicating the time the first image in the new sequence is captured) back to the operating system 1000. At block 1020, operating system calculates the sequence phase.

As an example calculation of the sequence phase at block 1020, suppose operating system 1000 issued the repeating request at time X_0=345 ms with exposure time E=50 ms, a desired synchronization precision P=10 ms, and suppose first timestamp X_1=397 ms (thus, a second image arrives at X_2=447 ms and a third image arrives at X_3=497 ms). Thus, the delay of operating system 1000 can be calculated at X_0−E=397−345=52 ms. If the desired phase D=0 and exposure time E=50 ms, then the repeating request may have a sequence phase of 397 ms−400 ms=−3 ms. This is less than the desired synchronization precision P=10 ms (e.g., within the range D−P to D+P), which indicates that the sequence phase is sufficiently aligned. Consequently, at block 1022, operating system 1000 notifies master device 832 that the phase is now aligned.

In some examples, the procedure of FIG. 10 can be adapted to temporarily interrupt a repeating request with a high priority single request of a given exposure time E. For example, after a repeating request with a calculated sequence phase of 25 ms, instead of reinitiating the repeating request, a single frame can be injected to delaying later images in the sequence by approximately a predetermined amount of time. Additional single frames can continued to be injected until the repeating request sequence phase achieves the desired precision.

Figure 11:
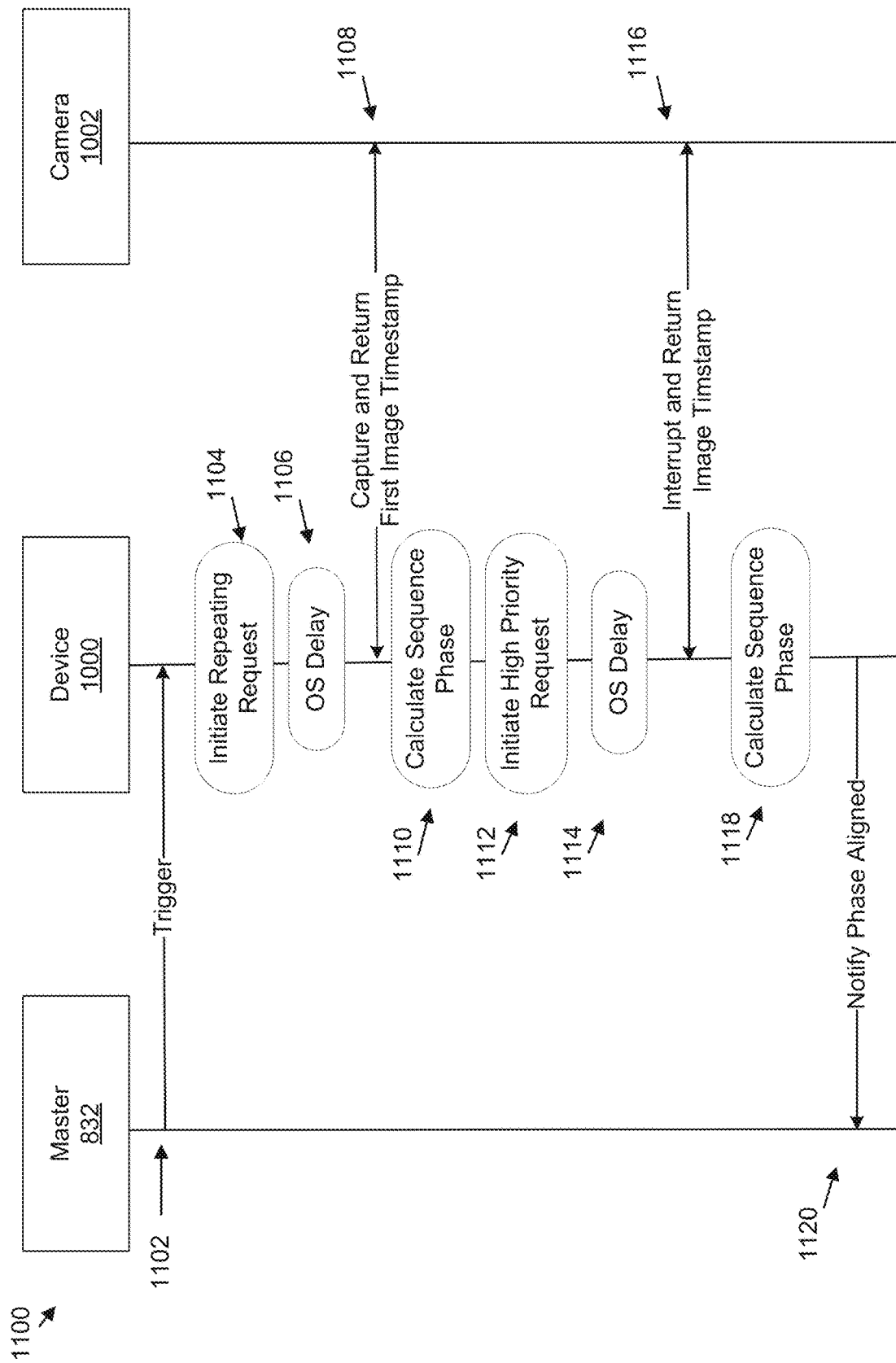
FIG. 11 is a message flow diagram illustrating a procedure using single frame requests by the multi-camera device of FIG. 8A, in accordance with example embodiments.

FIG. 11 is a message flow diagram illustrating a procedure using single frame requests by multi-camera device 830, in accordance with example embodiments. The procedure can begin at 1102. At 1102, master device 832 of multi-camera device 830 can issue a trigger request to operating system 1000 of a client device to capture an image. The trigger request can contain a desired exposure time E, a desired phase of the image sequence D, a desired synchronization precision P and/or other parameters. At block 1104, operating system 1000 can generate a repeating request and send the request to camera 1002. For example, the repeating request can contain the desired exposure time E and perhaps other parameters. At block 1106, the repeating request may be delayed by operating system 1000 (e.g., while operating system 1000 is performing other tasks). At 1108, the repeating request may be received by camera 1002, which acts on the repeating request and begins to periodically capture images. Camera 1002 sends a first image timestamp Y_1 (indicating the time the first image in the sequence is captured) back to the operating system 1000. At step 1110, operating system 1000 calculates the sequence phase.

To illustrate the calculation at 1110, for example, suppose operating system 1000 issued the repeating request at time Y_0=0 with exposure time E=50 ms, a desired synchronization precision P=10 ms, and suppose first time timestamp Y_1=75 ms (thus, a second image arrives at Y_2=1 25 ms and a third image arrives at Y_3=175 ms). Thus, delay of operating system 1000 can be calculated as Y_1−E=75 ms−50 ms=25 ms. If the desired phase D=0 and exposure time E=50 ms, then the repeating request has a sequence phase of 75 ms−50 ms=25 ms, which is greater than the desired than the desired synchronization precision P=10 ms. Namely, a suitable sequence phase would be within the range D−P to D+P.

At block 1112, upon determining that the sequence phase is greater than the desired precision, operating system 1000 can initiate a high priority request to capture a single frame to offset the sequence phase with the single frame. Building on the example at block 1110 above, this high priority request can be a request to capture a single frame with an exposure time of 25 ms+50 ms=75 ms. In this example, the single frame of 75 ms may offset the example sequence phase at 1110 of 25 ms, to have a new sequence phase of 0; e.g., 75 ms+25 ms=100 ms. As the exposure time E=50 ms, the new sequence phase is now 0 ms. At block 1114, the high priority request may be delayed by operating system 1000. At 1116, the high priority request can be received by camera 1002, which can responsively capture a single frame to insert the single frame into a sequence of images for the repeating request, thereby delaying the sequence of images by 75 ms. Once the single frame completes, camera 1002 sends a first image timestamp Z (indicating the time the first image in the shifted sequence is captured) back to the operating system 1000. At step 1118, operating system 1000 can calculate the sequence phase, in a similar method to as described above. At step 1120, upon indication that the sequence phase is sufficiently aligned, operating system 1000 notifies master device 832 that the phase is now aligned.

In some examples, operating system 1000 and camera 1002 can be embodied in any client devices 834. Moreover, part or all of FIG. 10 and FIG. 11 can be concurrently implemented across all client devices 834 such that master device 832 can receive notifications of phase alignment for all client devices 834. As such, once the master device 832 is notified that all client devices 834 are phase aligned, master device 832 can schedule a trigger as before, after which client devices 834 can send captured images to their destinations (e.g., saved to disk, transmitted over the Internet, sent to a downstream application, etc.). Additionally, since clocks of client devices 836 can be synchronized to master device 832 (as described in FIG. 9), the phase target for each of client devices 836 would be equal to the sum of the clock offset for the client device and desired exposure time E. Consequently, phase alignment is only necessary each time the user changes the desired exposure time E.

Example Data Network

Figure 12:
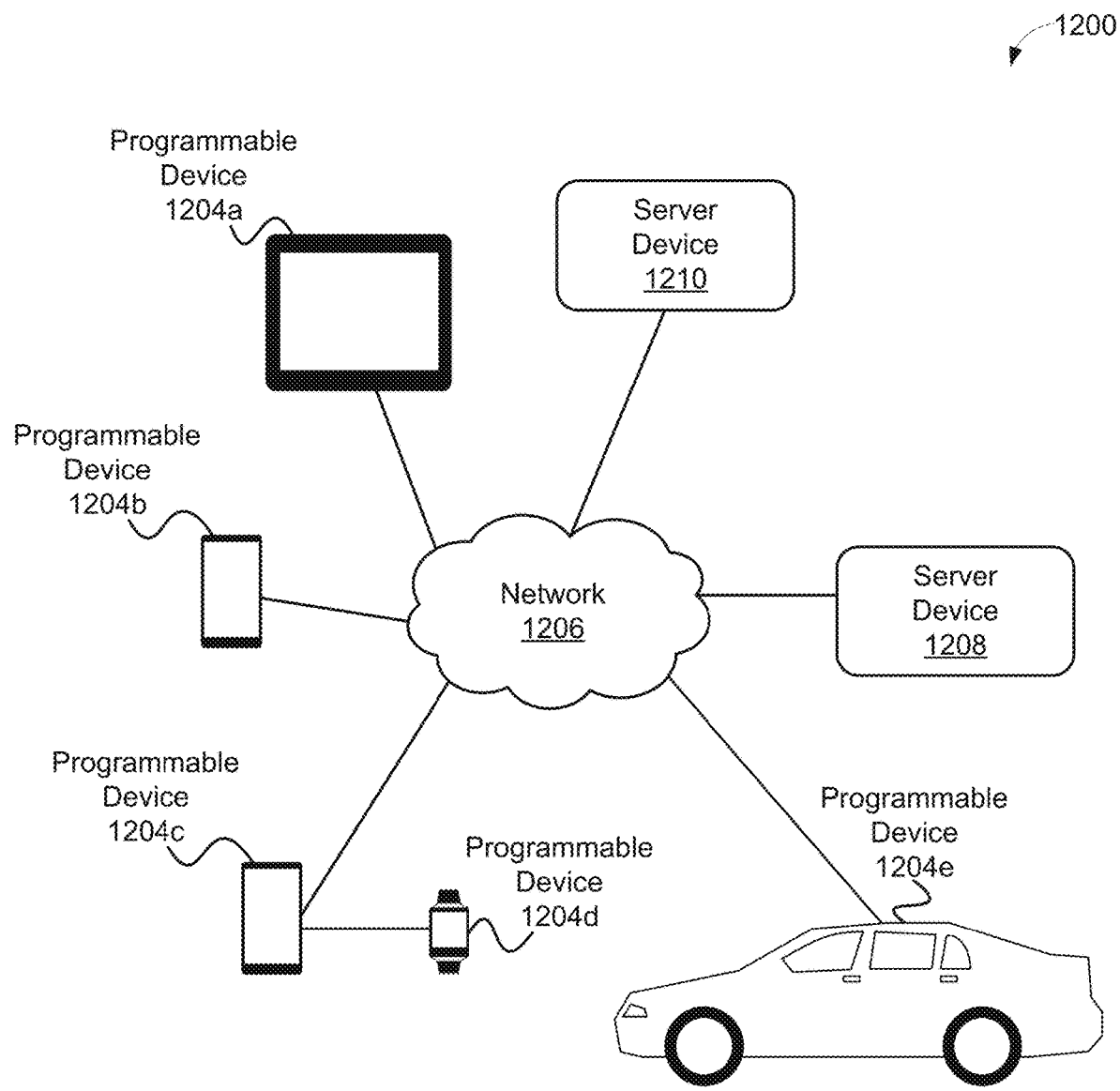
FIG. 12 depicts a distributed computing architecture, in accordance with example embodiments.

FIG. 12 depicts a distributed computing architecture 1200, in accordance with example embodiments. Distributed computing architecture 1200 includes server devices 1208, 1210 that are configured to communicate, via network 1206, with programmable devices 1204a, 1204b, 1204c, 1204d, 1204e. Network 1206 may correspond to a local area network (LAN), a wide area network (WAN), a wireless LAN (WLAN), a wireless WAN (WWAN), a corporate intranet, the public Internet, or any other type of network configured to provide a communications path between networked computing devices. Network 1206 may also correspond to a combination of one or more LANs, WANs, corporate intranets, and/or the public Internet.

Although FIG. 12 only shows five programmable devices, distributed application architectures may serve tens, hundreds, or thousands of programmable devices. Moreover, programmable devices 1204a, 1204b, 1204c, 1204d, 1204e (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1204a, 1204b, 1204c, 1204e, programmable devices can be directly connected to network 1206. In other examples, such as illustrated by programmable device 1204d, programmable devices can be indirectly connected to network 1206 via an associated computing device, such as programmable device 1204c. In this example, programmable device 1204c can act as an associated computing device to pass electronic communications between programmable device 1204d and network 1206. In other examples, such as illustrated by programmable device 1204e, a computing device can be part of and/or inside a vehicle, such as a car, a truck, a bus, a boat or ship, an airplane, etc. In other examples not shown in FIG. 12, a programmable device can be both directly and indirectly connected to network 1206.

Server devices 1208, 1210 can be configured to perform one or more services, as requested by programmable devices 1204a-1204e. For example, server device 1208 and/or 1210 can provide content to programmable devices 1204a-1204e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1208 and/or 1210 can provide programmable devices 1204a-1204e with access to software for database, search, computation, graphical, audio, video, World Wide Web/Internet utilization, and/or other functions. Many other examples of server devices are possible as well.

Computing Device Architecture

Figure 13:
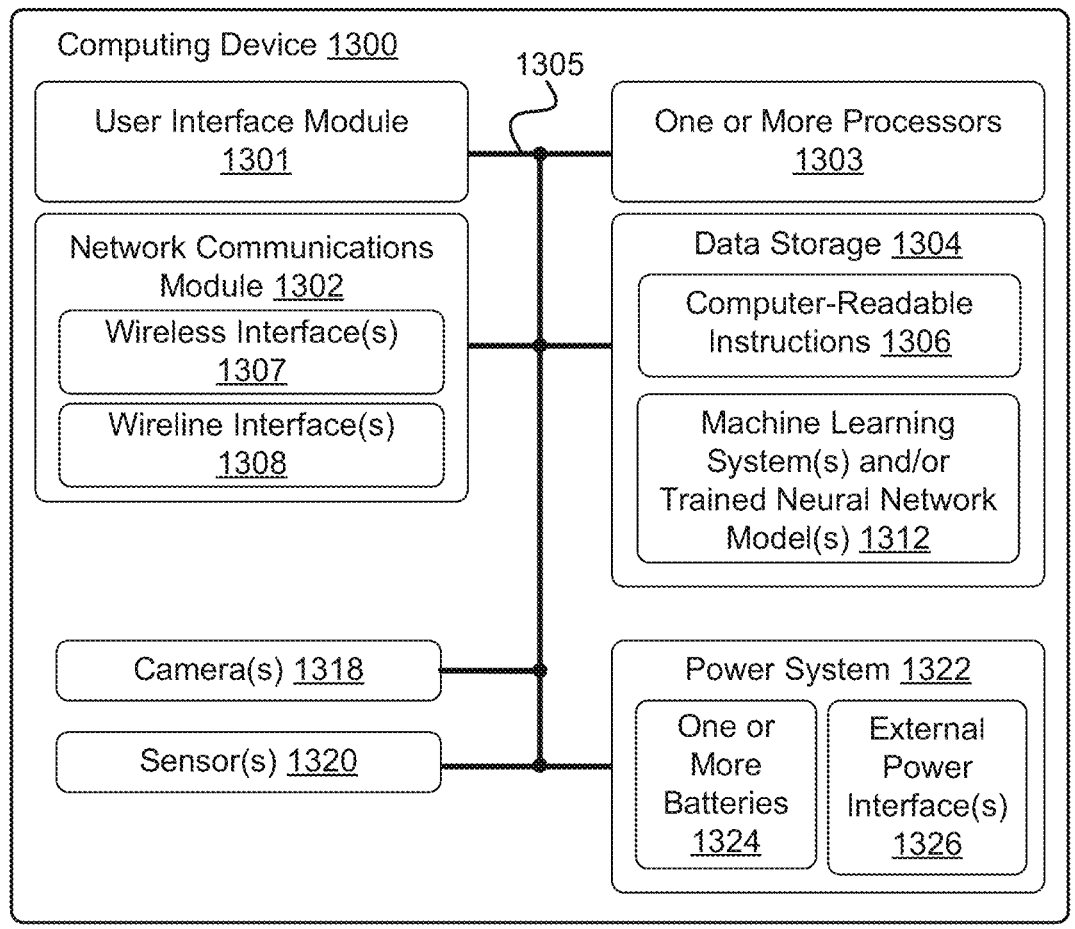
FIG. 13 is a block diagram of a computing device, in accordance with example embodiments.

FIG. 13 is a block diagram of a computing device 1300, in accordance with example embodiments. In particular, computing device 1300 shown in FIG. 13 can be configured to perform at least one function of and/or related to computing device 100, camera 110, dual pixel image 200, systems 300, 402 (including but not limited to neural network 420), stride 1 encoder function 600, stride 2 encoder function 650, decoder function 700, multi-camera devices 800, 830, distributed computing architecture 1200, and/or methods 1500, 1600.

Computing device 1300 may include a user interface module 1301, a network communications module 1302, one or more processors 1303, data storage 1304, one or more cameras 1318, one or more sensors 1320, and power system 1322, all of which may be linked together via a system bus, network, or other connection mechanism 1305.

User interface module 1301 can be operable to send data to and/or receive data from external user input/output devices. For example, user interface module 1301 can be configured to send and/or receive data to and/or from user input devices such as a touch screen, a computer mouse, a keyboard, a keypad, a touch pad, a track ball, a joystick, a voice recognition module, and/or other similar devices. User interface module 1301 can also be configured to provide output to user display devices, such as one or more screens (including touch screens), cathode ray tubes (CRT), liquid crystal displays, light emitting diodes (LEDs), displays using digital light processing (DLP) technology, printers, light bulbs, and/or other similar devices. User interface module 1301 can also be configured to generate audible outputs, with devices such as a speaker, speaker jack, audio output port, audio output device, earphones, and/or other similar devices. User interface module 1301 can further be configured with one or more haptic devices that can generate haptic outputs, such as vibrations and/or other outputs detectable by touch and/or physical contact with computing device 1300. In some examples, user interface module 1301 can be used to provide a graphical user interface (GUI) for utilizing computing device 1300.

Network communications module 1302 can include one or more devices that provide one or more wireless interfaces 1307 and/or one or more wireline interfaces 1308 that are configurable to communicate via a network. Wireless interface(s) 1307 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interface(s) 1308 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1302 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1303 can include one or more general purpose processors and/or one or more special purpose processors (e.g., digital signal processors (DSPs), tensor processing units (TPUs), graphics processing units (GPUs), application specific integrated circuits (ASICs), etc.). One or more processors 1303 can be configured to execute computer-readable instructions 1306 that are contained in data storage 1304 and/or other instructions as described herein.

Data storage 1304 can include one or more non-transitory computer-readable storage media that can be read and/or accessed by at least one of one or more processors 1303. The one or more non-transitory computer-readable storage media can include volatile and/or non-volatile storage components, such as optical, magnetic, organic or other memory or disc storage, which can be integrated in whole or in part with at least one of one or more processors 1303. In some examples, data storage 1304 can be implemented using a single physical device (e.g., one optical, magnetic, organic or other memory or disc storage unit), while in other examples, data storage 1304 can be implemented using two or more physical devices.

Data storage 1304 can include computer-readable instructions 1306 and perhaps additional data. In some examples, data storage 1304 can include storage required to perform at least part of the herein-described methods, scenarios, and techniques and/or at least part of the functionality of the herein-described devices and networks. In some examples, data storage 1304 can include storage for one or more machine learning systems and/or one or more trained machine learning models 1312 (e.g., one or more untrained, partially trained, and/or completely trained machine learning systems, such as one or more instances of neural network 420). In particular of these examples, computer-readable instructions 1306 can include instructions that, when executed by processor(s) 1303, enable computing device 1300 to provide some or all of the functionality of one or more machine learning systems and/or one or more trained machine learning models 1312.

In some examples, computing device 1300 can include camera(s) 1318. Camera(s) 1318 can include one or more image capture devices, such as still and/or video cameras, equipped to capture light and record the captured light in one or more images; that is, camera(s) 1318 can generate image(s) of captured light. The one or more images can be one or more still images and/or one or more images utilized in video imagery. Camera(s) 1318 can capture light and/or electromagnetic radiation emitted as visible light, infrared radiation, ultraviolet light, and/or as one or more other frequencies of light. In some examples, one or more cameras of camera(s) 1318 can capture dual pixel images and/or include one or more dual pixel light sensors, such as dual pixel light sensor 120. In some examples, computing device 1300 and/or camera(s) 1318 can be part or all of a multi-camera device, such as multi-camera device 800.

In some examples, computing device 1300 can include one or more sensors 1320. Sensors 1320 can be configured to measure conditions within computing device 1300 and/or conditions in an environment of computing device 1300 and provide data about these conditions. For example, sensors 1320 can include one or more of: (i) sensors for obtaining data about computing device 1300, such as, but not limited to, a thermometer for measuring a temperature of computing device 1300, a battery sensor for measuring power of one or more batteries of power system 1322, and/or other sensors measuring conditions of computing device 1300; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1300, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1300, such as, but not limited to, an infrared sensor, an optical sensor, a light sensor, a dual pixel light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1300, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1320 are possible as well.

Power system 1322 can include one or more batteries 1324 and/or one or more external power interfaces 1326 for providing electrical power to computing device 1300. Each battery of the one or more batteries 1324 can, when electrically coupled to the computing device 1300, act as a source of stored electrical power for computing device 1300. One or more batteries 1324 of power system 1322 can be configured to be portable. Some or all of one or more batteries 1324 can be readily removable from computing device 1300. In other examples, some or all of one or more batteries 1324 can be internal to computing device 1300, and so may not be readily removable from computing device 1300. Some or all of one or more batteries 1324 can be rechargeable. For example, a rechargeable battery can be recharged via a wired connection between the battery and another power supply, such as by one or more power supplies that are external to computing device 1300 and connected to computing device 1300 via the one or more external power interfaces. In other examples, some or all of one or more batteries 1324 can be non-rechargeable batteries.

One or more external power interfaces 1326 of power system 1322 can include one or more wired-power interfaces, such as a USB cable and/or a power cord, that enable wired electrical power connections to one or more power supplies that are external to computing device 1300. One or more external power interfaces 1326 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1326, computing device 1300 can draw electrical power from the external power source the established electrical power connection. In some examples, power system 1322 can include related sensors, such as battery sensors associated with the one or more batteries or other types of electrical power sensors.

Cloud-Based Servers

Figure 14:
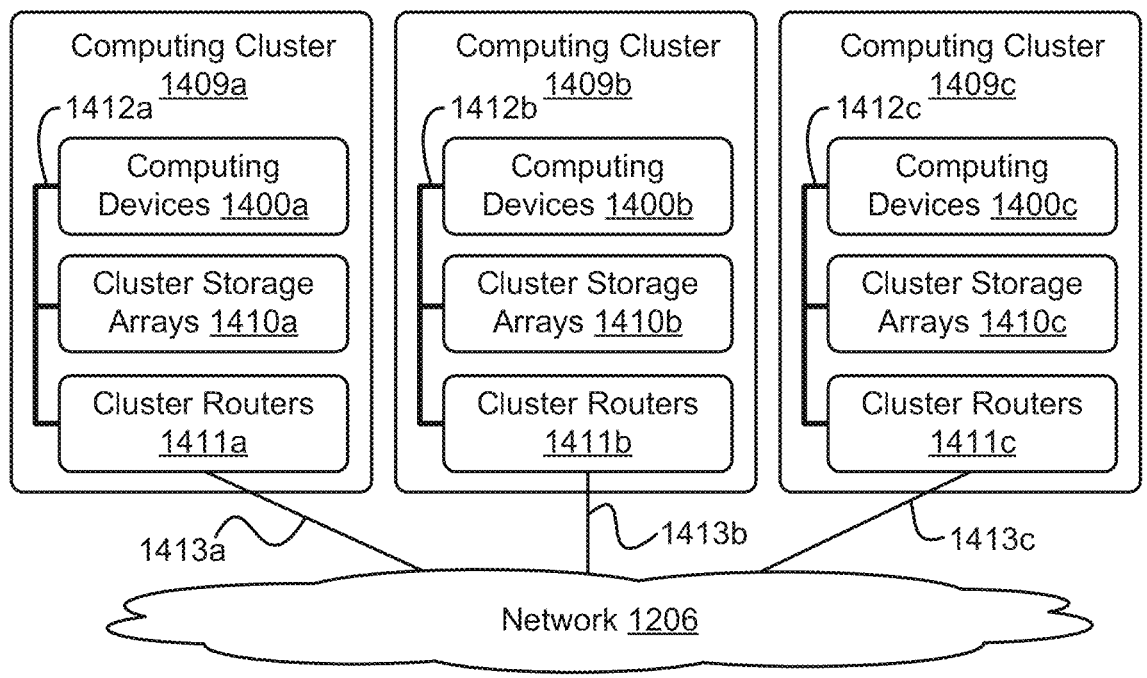
FIG. 14 depicts a network of computing clusters arranged as a cloud-based server system, in accordance with example embodiments.

FIG. 14 depicts a network of computing clusters arranged as a cloud-based server system, in accordance with example embodiments. FIG. 14 depicts a network 1206 of computing clusters 1409a, 1409b, 1409c arranged as a cloud-based server system in accordance with an example embodiment. Computing clusters 1409a, 1409b, 1409c can be cloud-based devices that store program logic and/or data of cloud-based applications and/or services; e.g., perform at least one function of and/or related to computing device 100, camera 110, dual pixel image 200, systems 300, 402 (including but not limited to neural network 420), stride 1 encoder function 600, stride 2 encoder function 650, decoder function 700, multi-camera devices 800, 830, distributed computing architecture 1200, and/or methods 1500, 1600.

In some embodiments, computing clusters 1409a, 1409b, 1409c can be a single computing device residing in a single computing center. In other embodiments, computing clusters 1409a, 1409b, 1409c can include multiple computing devices in a single computing center, or even multiple computing devices located in multiple computing centers located in diverse geographic locations. For example, FIG. 14 depicts each of computing clusters 1409a, 1409b, and 1409c residing in different physical locations.

In some embodiments, data and services at computing clusters 1409a, 1409b, 1409c can be encoded as computer readable information stored in non-transitory, tangible computer readable media (or computer readable storage media) and accessible by other computing devices. In some embodiments, computing clusters 1409a, 1409b, 1409c can be stored on a single disk drive or other non-transitory, tangible storage media, or can be implemented on multiple disk drives or other tangible storage media located at one or more diverse geographic locations.

FIG. 14 depicts a cloud-based server system in accordance with an example embodiment. In FIG. 14, functionality of system 402, multi-camera devices 800, 830, and/or a computing device can be distributed among computing clusters 1409a, 1409b, 1409c. Computing cluster 1409a can include one or more computing devices 1400a, cluster storage arrays 1410a, and cluster routers 1411a connected by a local cluster network 1412a. Similarly, computing cluster 1409b can include one or more computing devices 1400b, cluster storage arrays 1410b, and cluster routers 1411b connected by a local cluster network 1412b. Likewise, computing cluster 1409c can include one or more computing devices 1400c, cluster storage arrays 1410c, and cluster routers 1411c connected by a local cluster network 1412c.

In some embodiments, each of computing clusters 1409a, 1409b, and 1409c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1409a, for example, computing devices 1400a can be configured to perform various computing tasks of system 402, multi-camera devices 800, 830, and/or a computing device. In one embodiment, the various functionalities of system 402, multi-camera devices 800, 830, and/or a computing device can be distributed among one or more of computing devices 1400a, 1400b, 1400c. Computing devices 1400b and 1400c in respective computing clusters 1409b and 1409c can be configured similarly to computing devices 1400a in computing cluster 1409a. On the other hand, in some embodiments, computing devices 1400a, 1400b, and 1400c can be configured to perform different functions.

In some embodiments, computing tasks and stored data associated with system 402, multi-camera devices 800, 830, and/or a computing device can be distributed across computing devices 1400a, 1400b, and 1400c based at least in part on the processing requirements of system 402, multi-camera devices 800, 830, and/or a computing device, the processing capabilities of computing devices 1400a, 1400b, 1400c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1410a, 1410b, 1410c of computing clusters 1409a, 1409b, 1409c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of system 402, multi-camera devices 800, 830, and/or a computing device can be distributed across computing devices 1400a, 1400b, 1400c of computing clusters 1409a, 1409b, 1409c, various active portions and/or backup portions of these components can be distributed across cluster storage arrays 1410a, 1410b, 1410c. For example, some cluster storage arrays can be configured to store one portion of the data of system 402, multi-camera devices 800, 830, and/or a computing device, while other cluster storage arrays can store other portion(s) of data of system 402, multi-camera devices 800, 830, and/or a computing device. Additionally, some cluster storage arrays can be configured to store backup versions of data stored in other cluster storage arrays.

Cluster routers 1411a, 1411b, 1411c in computing clusters 1409a, 1409b, 1409c can include networking equipment configured to provide internal and external communications for the computing clusters. For example, cluster routers 1411a in computing cluster 1409a can include one or more internet switching and routing devices configured to provide (i) local area network communications between computing devices 1400a and cluster storage arrays 1410a via local cluster network 1412a, and (ii) wide area network communications between computing cluster 1409a and computing clusters 1409b and 1409c via wide area network link 1413a to network 1206. Cluster routers 1411b and 1411c can include network equipment similar to cluster routers 1411a, and cluster routers 1411b and 1411c can perform similar networking functions for computing clusters 1409b and 1409b that cluster routers 1411a perform for computing cluster 1409a.

In some embodiments, the configuration of cluster routers 1411a, 1411b, 1411c can be based at least in part on the data communication requirements of the computing devices and cluster storage arrays, the data communications capabilities of the network equipment in cluster routers 1411a, 1411b, 1411c, the latency and throughput of local cluster networks 1412a, 1412b, 1412c, the latency, throughput, and cost of wide area network links 1413a, 1413b, 1413c, and/or other factors that can contribute to the cost, speed, fault-tolerance, resiliency, efficiency and/or other design criteria of the moderation system architecture.

Example Methods of Operation

FIG. 15 is a flowchart of method 1500, in accordance with example embodiments. Method 1500 can be executed by a computing device, such as computing device 1300. Method 1500 can begin at block 1510, where the computing device can receive a dual pixel image of at least a foreground object, the dual pixel image including a plurality of dual pixels, where a dual pixel of the plurality of dual pixels can include a left-side pixel and a right-side pixel that both represent light incident on a single dual pixel element used to capture the dual pixel image, such as discussed above at least in the context of FIGS. 1, 2, 4, and 5.

At block 1520, the computing device can be used to train a machine learning system to determine a depth map associated with the dual pixel image, such as discussed above at least in the context of FIGS. 3 and 4.

At block 1530, the computing device can be used to provide the trained machine learning system, such as discussed above at least in the context of FIGS. 3 and 4.

In some examples, training the machine learning system to determine the depth map can include training the machine learning system to determine the depth map based on a loss function that can include an affine mapping of an estimate of the depth map, such as discussed above at least in the context of FIG. 4.

In some examples, training the machine learning system to determine the depth map based on the loss function can include training the machine learning system to determine the depth map based on a loss function that can include a difference between the affine mapping of the estimate of the depth map and a reference depth map, such as discussed above at least in the context of FIG. 4.

In some examples, the foreground object can have a first object type, and training the machine learning system to determine the depth map can include training the machine learning system to determine the depth map using a plurality of images of objects having the first object type, such as discussed above at least in the context of FIG. 4.

In some examples, the first object type can be associated with a face of a person, such as discussed above at least in the context of FIG. 4.

In some examples, receiving, at the computing device, the dual pixel image of at least the foreground object can include: obtaining a plurality of dual pixel images of at least the foreground object within a threshold period of time using a multi-camera device, each image of the plurality of dual pixel images can include a plurality of dual pixels, where the multi-camera device can include a plurality of cameras; and receiving, at the computing device, the plurality of dual pixel images of at least the foreground object, such as discussed above at least in the context of FIGS. 8A, 8B, 9, 10, and 11.

In some examples, each of the plurality of cameras of the multi-camera device can include a system clock, and obtaining the plurality of dual pixel images of the foreground object using the multi-camera device can include: determining a master camera of the plurality of cameras of the multi-camera device, the master camera having a master clock; at each camera of the plurality of cameras of the multi-camera device other than the master camera, determining an offset between the system clock of the camera and the master clock; determining a maximum offset of the offsets of the plurality of cameras; at the master camera, sending a message to each of the plurality of cameras of the multi-camera device other than the master camera to capture a dual pixel image at a future trigger time, where the future trigger time can be greater than the maximum offset; and capturing, by each of the plurality of cameras of the multi-camera device at the future trigger time, a dual pixel image of the foreground object, such as discussed above at least in the context of FIGS. 8A, 8B, 9, 10, and 11.

In some examples, sending the message to each of the plurality of cameras of the multi-camera device other than the master camera to capture a dual pixel image at the future trigger time can include sending a repeating request to each of the plurality of cameras of the multi-camera device other than the master camera to periodically capture a plurality of dual pixel images starting at the future trigger time; and capturing, by each of the plurality of cameras of the multi-camera device at the future trigger time, a dual pixel image of the foreground object can include periodically capturing, by each of the plurality of cameras of the multi-camera device starting at the future trigger time, a plurality of dual pixel images, such as discussed above at least in the context of FIGS. 8A, 8B, 9, 10, and 11.

In some examples, sending the repeating request to each of the plurality of cameras of the multi-camera device other than the master camera to periodically capture the plurality of dual pixel images starting at the future trigger time further can include: after sending the repeating request, sending a high priority request to one or more delayed cameras of the multi-camera device, where the high priority request can interrupt the repeating request and can reset a time period for periodically capturing the plurality of dual pixel images, such as discussed above at least in the context of FIGS. 8A, 8B, 9, 10, and 11.

In some examples, training the machine learning system to determine the depth map can include training a neural network to determine the depth map, such as discussed above at least in the context of FIGS. 3 and 4.

FIG. 16 is a flowchart of method 1600, in accordance with example embodiments. Method 1600 can be executed by a computing device, such as computing device 1300. Method 1600 can begin at block 1610, where the computing device can receive a dual pixel image of at least a foreground object, where the dual pixel image can include a plurality of dual pixels, where a dual pixel of the plurality of dual pixels can include a left-side pixel and a right-side pixel that both represent light incident on a single dual pixel element used to capture the dual pixel image, such as discussed above at least in the context of FIGS. 3 and 4.

At block 1620, the computing device can provide the dual pixel image to a trained machine learning system to determine a depth map for the plurality of dual pixels of the dual pixel image, such as discussed above at least in the context of FIGS. 3, 4, 5, 6A, 6B, and 7.

At block 1630, the computing device can be used to determine an output image based on the dual pixel image and the depth map, such as discussed above at least in the context of FIG. 4.

In some examples, where determining the output image based on the dual pixel image and the depth map can include: receiving, at the computing device, a request to blur a background of the dual pixel image, where the background of the dual pixel image does not include the foreground object; and determining the output image by blurring at least a portion of the background of the dual pixel image based on the depth map using the computing device, such as discussed above at least in the context of FIG. 4.

In some examples, method 1600 can further include: providing the output image using the computing device, such as discussed above at least in the context of FIG. 4.

In some examples, the computing device can include a camera; and receiving the dual pixel image of at least the foreground object can include: generating the dual pixel image of at least the foreground object using the camera; and receiving, at the computing device, the generated dual pixel image from the camera, such as discussed above at least in the context of FIG. 4.

In some examples, the trained machine learning system can be trained using the computing device, such as discussed above at least in the context of FIGS. 3 and 4.

In some examples, the trained machine learning system can be trained using a second computing device that differs from the computing device; and providing the dual pixel image to the trained machine learning system to determine the depth map for the plurality of dual pixels of the dual pixel image can include: receiving the trained machine learning system at the computing device; and after receiving the trained machine learning system at the computing device, providing the dual pixel image to the trained machine learning system of the computing device to determine the depth map for the plurality of dual pixels of the dual pixel image, such as discussed above at least in the context of FIGS. 3 and 4.

In some examples, the trained machine learning system can be resident on a second computing device that differs from the computing device; and providing the dual pixel image to the trained machine learning system to determine the depth map for the plurality of dual pixels of the dual pixel image can include: receiving the dual pixel image at the second computing device from the second computing device; after receiving the dual pixel image, the second computing device providing the dual pixel image to the trained machine learning system of the second computing device to determine the depth map for the plurality of dual pixels of the dual pixel image; and sending the depth map from the second computing device to the computing device, such as discussed above at least in the context of FIGS. 3 and 4.

In some examples, the trained machine learning system can be resident on a second computing device that differs from the computing device; and providing the dual pixel image to the trained machine learning system to determine the depth map for the plurality of dual pixels of the dual pixel image can include: receiving the dual pixel image at the second computing device from the second computing device, and after receiving the dual pixel image, the second computing device providing the dual pixel image to the trained machine learning system of the second computing device to determine the depth map for the plurality of dual pixels of the dual pixel image, and where determining the output image based on the dual pixel image and the depth map by the computing device can include: determining the output image based on the dual pixel image and the depth map using the second computing device, and sending the output image from the second computing device to the computing device, such as discussed above at least in the context of FIGS. 3 and 4.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A computer-implemented method, comprising:
   receiving, at a computing device, a dual pixel image of at least a foreground object, the dual pixel image comprising a plurality of dual pixels, wherein a dual pixel of the plurality of dual pixels comprises a left-side pixel and a right-side pixel that both represent light incident on a single dual pixel element used to capture the dual pixel image;
   training a machine learning system to determine a depth map associated with the dual pixel image using the computing device, wherein training the machine learning system to determine the depth map comprises training the machine learning system to determine the depth map based on a loss function that is invariant to depth ambiguities caused by lens characteristics of a lens used to capture the dual pixel image; and
   providing the trained machine learning system using the computing device.

2. The computer-implemented method of claim 1, wherein the depth ambiguities comprise unknown scale and offset values.

3. The computer-implemented method of claim 1, wherein the lens characteristics comprise a point spread function of the lens.

4. The computer-implemented method of claim 1, wherein the foreground object has a first object type, and wherein training the machine learning system to determine the depth map comprises training the machine learning system to determine the depth map using a plurality of images of objects having the first object type.

5. The computer-implemented method of claim 4, wherein the first object type is associated with a face of a person.

6. The computer-implemented method of claim 1, wherein receiving, at the computing device, the dual pixel image of at least the foreground object comprises:
   obtaining a plurality of dual pixel images of at least the foreground object within a threshold period of time using a multi-camera device, each image of the plurality of dual pixel images comprising a plurality of dual pixels, wherein the multi-camera device comprises a plurality of cameras; and
   receiving, at the computing device, the plurality of dual pixel images of at least the foreground object.

7. The computer-implemented method of claim 6, wherein each of the plurality of cameras of the multi-camera device comprises a system clock, and wherein obtaining the plurality of dual pixel images of the foreground object using the multi-camera device comprises:
   determining a master camera of the plurality of cameras of the multi-camera device, the master camera having a master clock;
   at each camera of the plurality of cameras of the multi-camera device other than the master camera, determining an offset between the system clock of the camera and the master clock;
   determining a maximum offset of the offsets of the plurality of cameras;
   at the master camera, sending a message to each of the plurality of cameras of the multi-camera device other than the master camera to capture a dual pixel image at a future trigger time, wherein the future trigger time is greater than the maximum offset; and
   capturing, by each of the plurality of cameras of the multi-camera device at the future trigger time, a dual pixel image of the foreground object.

8. The computer-implemented method of claim 7, wherein sending the message to each of the plurality of cameras of the multi-camera device other than the master camera to capture a dual pixel image at the future trigger time comprises sending a repeating request to each of the plurality of cameras of the multi-camera device other than the master camera to periodically capture a plurality of dual pixel images starting at the future trigger time; and wherein capturing, by each of the plurality of cameras of the multi-camera device at the future trigger time, a dual pixel image of the foreground object comprises periodically capturing, by each of the plurality of cameras of the multi-camera device starting at the future trigger time, a plurality of dual pixel images.

9. The computer-implemented method of claim 8, wherein sending the repeating request to each of the plurality of cameras of the multi-camera device other than the master camera to periodically capture the plurality of dual pixel images starting at the future trigger time further comprises:
   after sending the repeating request, sending a high priority request to one or more delayed cameras of the multi-camera device, wherein the high priority request interrupts the repeating request and resets a time period for periodically capturing the plurality of dual pixel images.

10. The computer-implemented method of claim 1, wherein training the machine learning system to determine the depth map comprises training a neural network to determine the depth map.

11. A computer-implemented method, comprising:
   receiving, at a computing device, a dual pixel image of at least a foreground object, the dual pixel image comprising a plurality of dual pixels, wherein a dual pixel of the plurality of dual pixels comprises a left-side pixel and a right-side pixel that both represent light incident on a single dual pixel element used to capture the dual pixel image;
   providing the dual pixel image to a trained machine learning system to determine a depth map for the plurality of dual pixels of the dual pixel image, wherein the trained machine learning system comprises a neural network trained using training images and a loss function that is invariant to depth ambiguities caused by lens characteristics of a lens used to capture the training images; and
   determining an output image based on the dual pixel image and the depth map using the computing device.

12. The computer-implemented method of claim 11, wherein determining the output image based on the dual pixel image and the depth map comprises:
   receiving, at the computing device, a request to blur a background of the dual pixel image, wherein the background of the dual pixel image does not include the foreground object; and
   determining the output image by blurring at least a portion of the background of the dual pixel image based on the depth map using the computing device.

13. The computer-implemented method of claim 11, further comprising:
   providing the output image using the computing device.

14. The computer-implemented method of claim 11, wherein the computing device comprises a camera, and wherein receiving the dual pixel image of at least the foreground object comprises:
   generating the dual pixel image of at least the foreground object using the camera; and
   receiving, at the computing device, the generated dual pixel image from the camera.

15. The computer-implemented method of claim 11, wherein the trained machine learning system is trained using the computing device.

16. The computer-implemented method of claim 11, wherein the trained machine learning system is trained using a second computing device that differs from the computing device; and
   wherein providing the dual pixel image to the trained machine learning system to determine the depth map for the plurality of dual pixels of the dual pixel image comprises:
      receiving the trained machine learning system at the computing device; and
      after receiving the trained machine learning system at the computing device, providing the dual pixel image to the trained machine learning system of the computing device to determine the depth map for the plurality of dual pixels of the dual pixel image.

17. The computer-implemented method of claim 11, wherein the trained machine learning system is resident on a second computing device that differs from the computing device; and
   wherein providing the dual pixel image to the trained machine learning system to determine the depth map for the plurality of dual pixels of the dual pixel image comprises:
      receiving the dual pixel image at the second computing device from the second computing device;
      after receiving the dual pixel image, the second computing device providing the dual pixel image to the trained machine learning system of the second computing device to determine the depth map for the plurality of dual pixels of the dual pixel image; and
      sending the depth map from the second computing device to the computing device.

18. The computer-implemented method of claim 11, wherein the trained machine learning system is resident on a second computing device that differs from the computing device;
   wherein providing the dual pixel image to the trained machine learning system to determine the depth map for the plurality of dual pixels of the dual pixel image comprises:
      receiving the dual pixel image at the second computing device from the second computing device, and
      after receiving the dual pixel image, the second computing device providing the dual pixel image to the trained machine learning system of the second computing device to determine the depth map for the plurality of dual pixels of the dual pixel image, and
   wherein determining the output image based on the dual pixel image and the depth map by the computing device comprises:
      determining the output image based on the dual pixel image and the depth map using the second computing device, and
      sending the output image from the second computing device to the computing device.

19. A computing device, comprising:
   one or more processors; and
   data storage, wherein the data storage has stored thereon computer-executable instructions that, when executed by the one or more processors, cause the computing device to carry out functions comprising:
      receiving a dual pixel image of at least a foreground object, the dual pixel image comprising a plurality of dual pixels, wherein a dual pixel of the plurality of dual pixels comprises a left-side pixel and a right-side pixel that both represent light incident on a single dual pixel element used to capture the dual pixel image;

providing the dual pixel image to a trained machine learning system to determine a depth map for the plurality of dual pixels of the dual pixel image, wherein the trained machine learning system comprises a neural network trained using training images and a loss function that is invariant to depth ambiguities caused by lens characteristics of a lens used to capture the training images; and determining an output image based on the dual pixel image and the depth map.

20. The computing device of claim 19, wherein determining the output image based on the dual pixel image and the depth map comprises:

receiving a request to blur a background of the dual pixel image, wherein the background of the dual pixel image does not include the foreground object; and determining the output image by blurring at least a portion of the background of the dual pixel image based on the depth map.

\* \* \* \* \*